(12) United States Patent
Kodama et al.

(10) Patent No.: US 8,301,654 B2
(45) Date of Patent: Oct. 30, 2012

(54) GEOGRAPHICAL DISTRIBUTED STORAGE SYSTEM BASED ON HIERARCHICAL PEER TO PEER ARCHITECTURE

(75) Inventors: Shoji Kodama, Singapore (SG); Wujuan Lin, Singapore (SG)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 12/391,548

(22) Filed: Feb. 24, 2009

(65) Prior Publication Data
US 2010/0228798 A1     Sep. 9, 2010

(51) Int. Cl.
G06F 17/30     (2006.01)
(52) U.S. Cl. ......................................... 707/770
(58) Field of Classification Search .................. 707/770
See application file for complete search history.

(56) References Cited

U.S. PATENT DOCUMENTS

| | | | |
|---|---|---|---|
| 2004/0054807 A1 | 3/2004 | Harvey et al. | |
| 2004/0085329 A1 | 5/2004 | Xu et al. | |
| 2004/0249970 A1 | 12/2004 | Castro et al. | |
| 2009/0271412 A1* | 10/2009 | Lacapra et al. ................. | 707/10 |

* cited by examiner

Primary Examiner — Hosain Alam
Assistant Examiner — Johnese Johnson
(74) Attorney, Agent, or Firm — Brundidge & Stanger, P.C.

(57) ABSTRACT

A geographically distributed storage system including a global Peer-To-Peer (P2P) ring and a local P2P ring. The global P2P ring includes all storage nodes and the local P2P ring includes a group of the storage nodes. Each of the group of storage node belongs to the global P2P ring and the local P2P ring and each storage node includes global and local management information. The global management information includes a node table for managing topology information of a network connecting the group, a metadata table for managing locations of stored data objects, and a global routing table for managing routing in the global P2P ring. The local management information includes an object management table for managing stored data objects in the group, a Logical Unit (LU) management table for managing logical units in the group and a local routing table used for managing routing in the local P2P ring.

20 Claims, 37 Drawing Sheets

Geographical Distributed Storage System

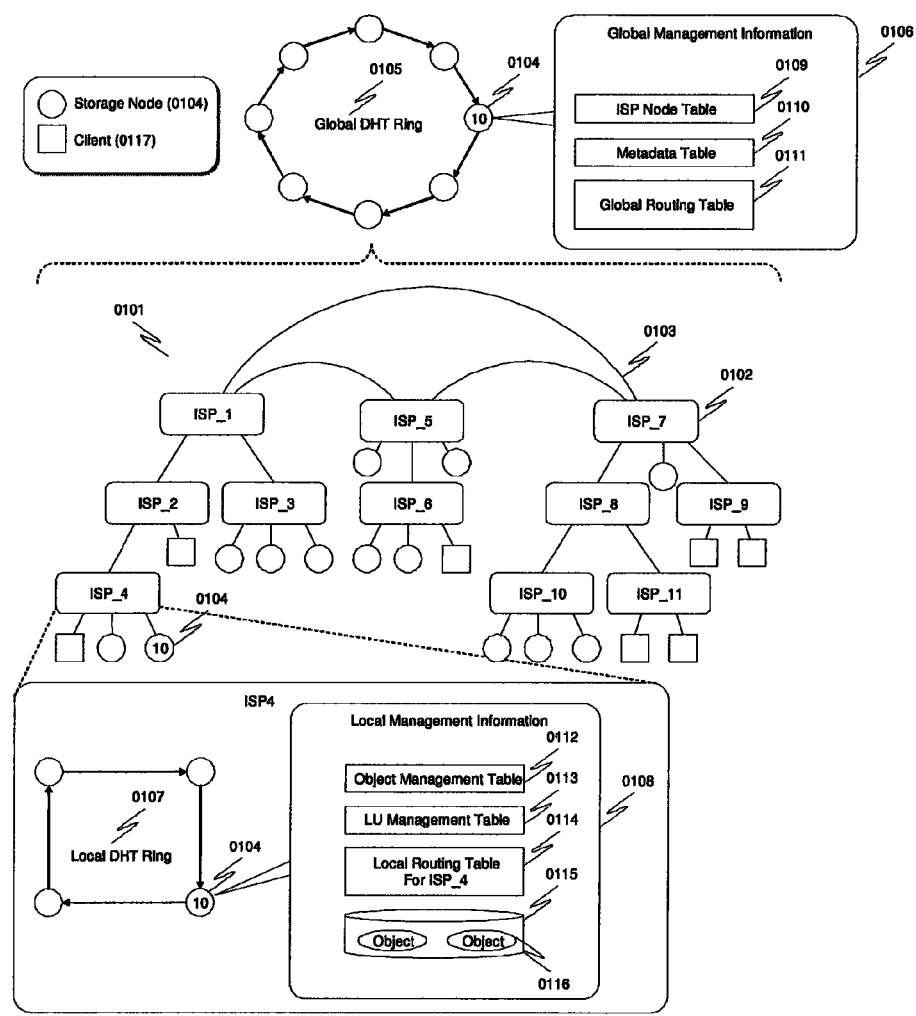
FIG. 1: Geographical Distributed Storage System

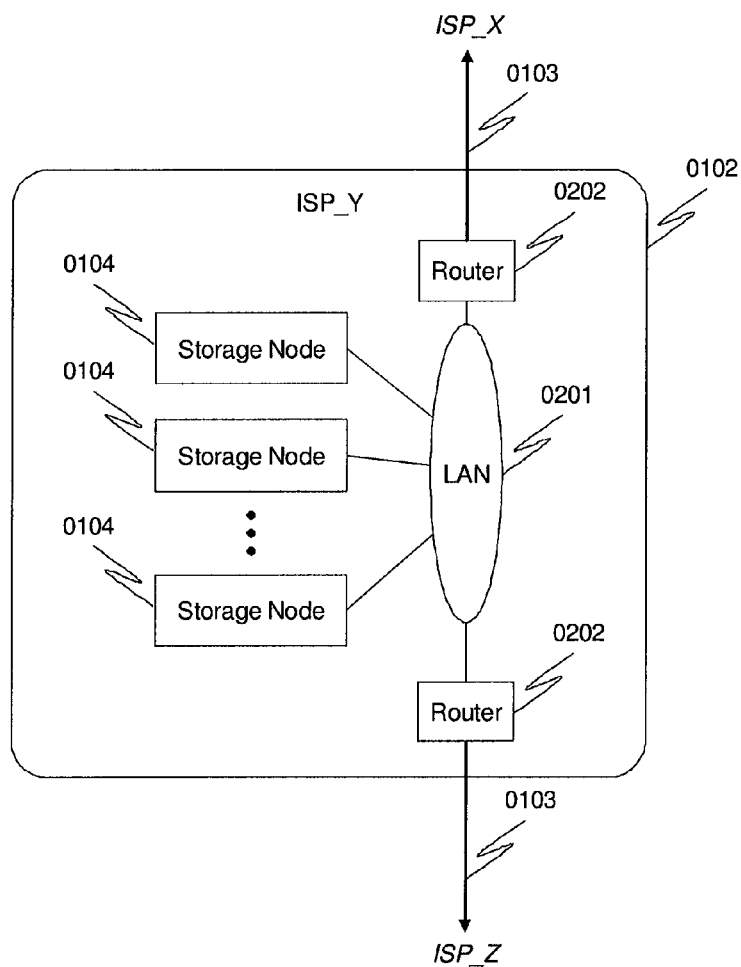
FIG. 2: System Configuration within an ISP

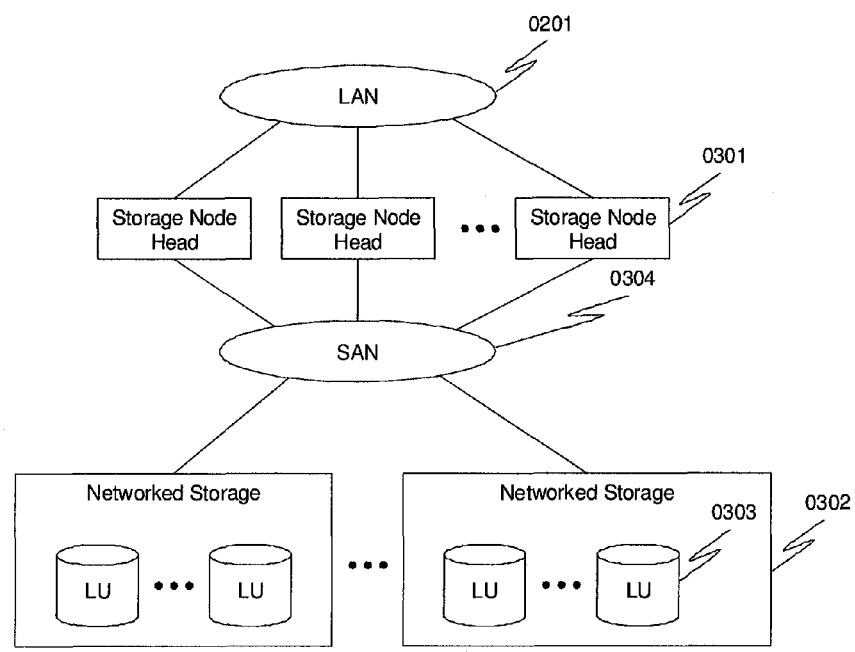
FIG. 3: Configuration of Storage Node by using a SAN

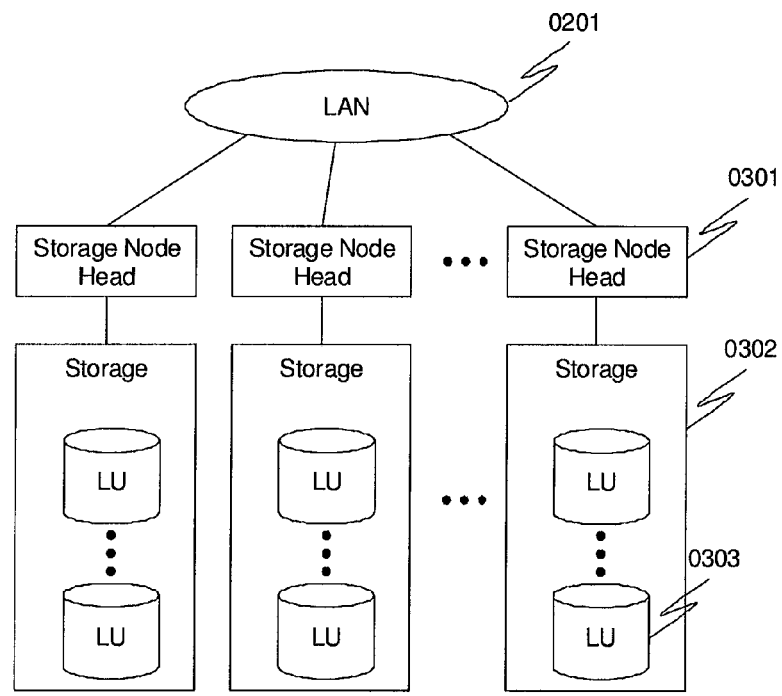
FIG. 4: Configuration of Storage Node by using a Dedicated Storage
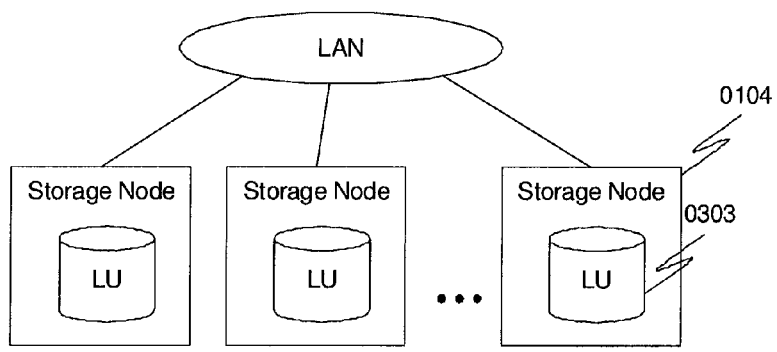
FIG. 5: Configuration of Storage Node without External Storage

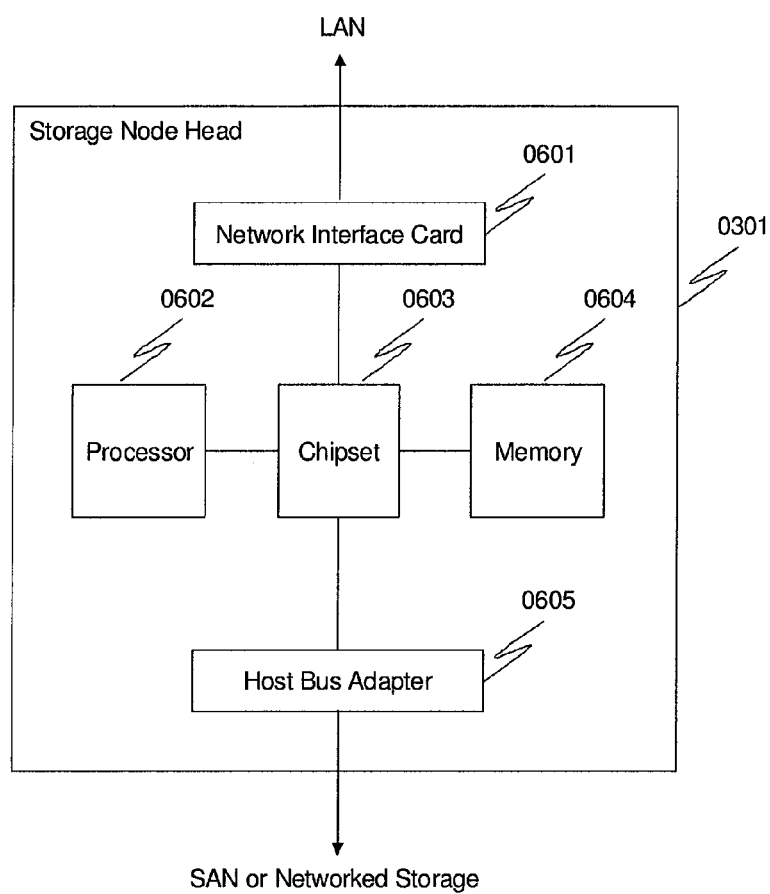
FIG. 6: Internal of Storage Node Head

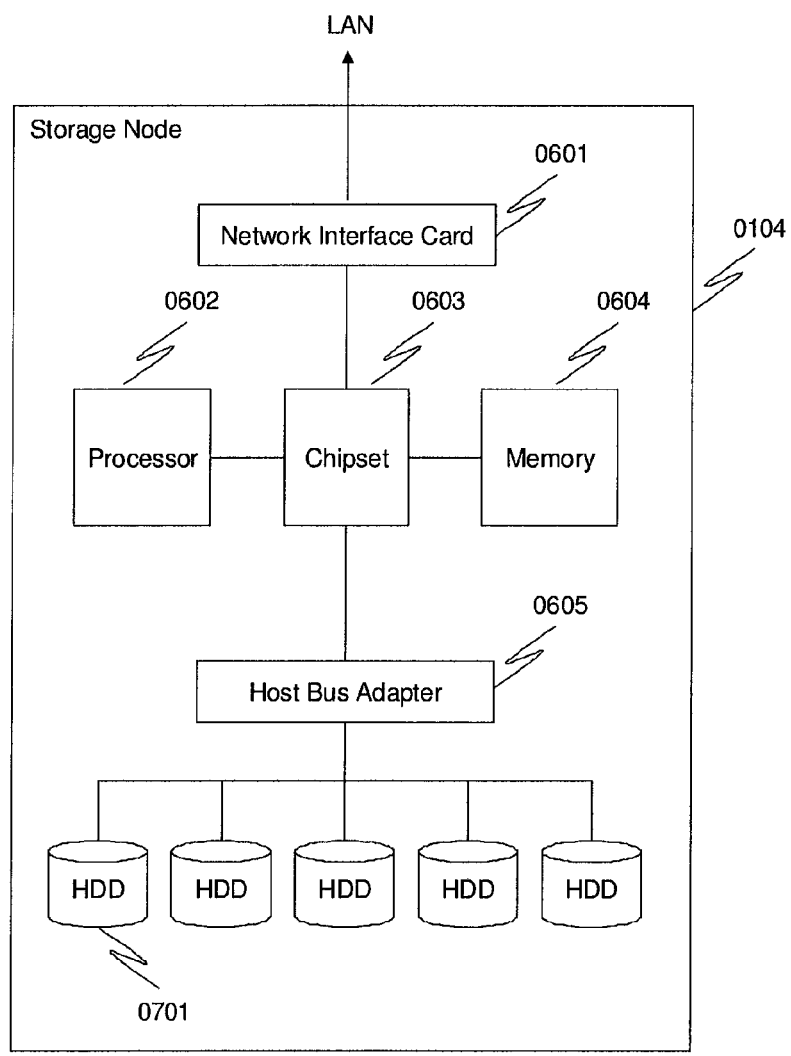
FIG. 7: Internal of Storage Node (Internal of Networked Storage is same as Storage Node)

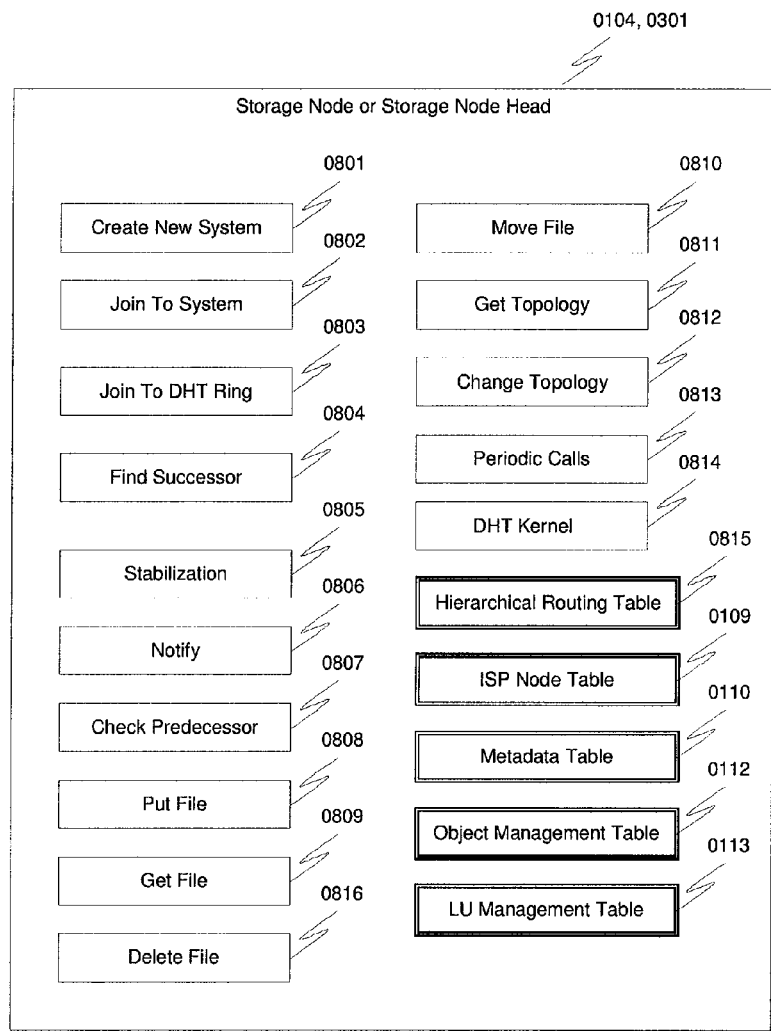
FIG. 8: Programs and Tables on Storage Node

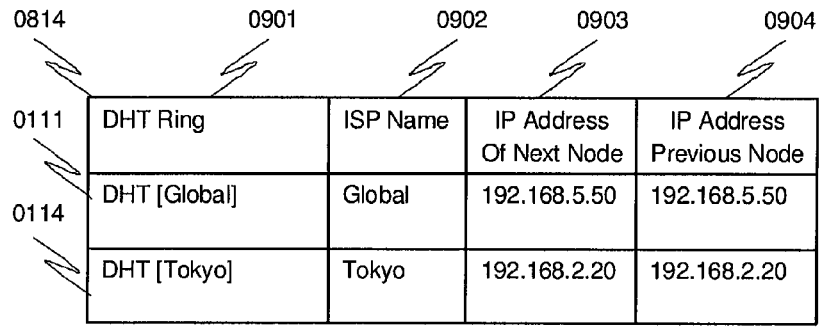
FIG. 9: Hierarchical Routing Table
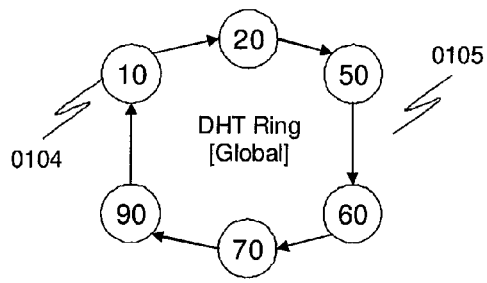
FIG. 10: Example of Global DHT Ring
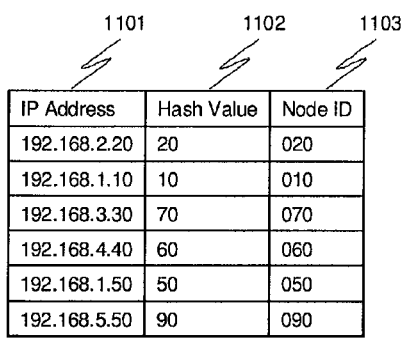
FIG. 11: Example of Mapping IP Address to Node ID

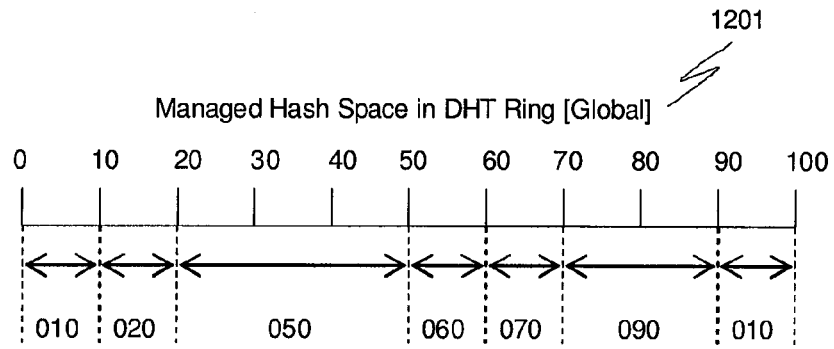
FIG. 12: Example of Managed Hash Space in Global DHT Ring
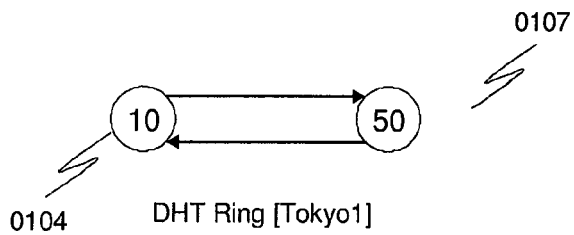
FIG. 13: Example of Local DHT Ring
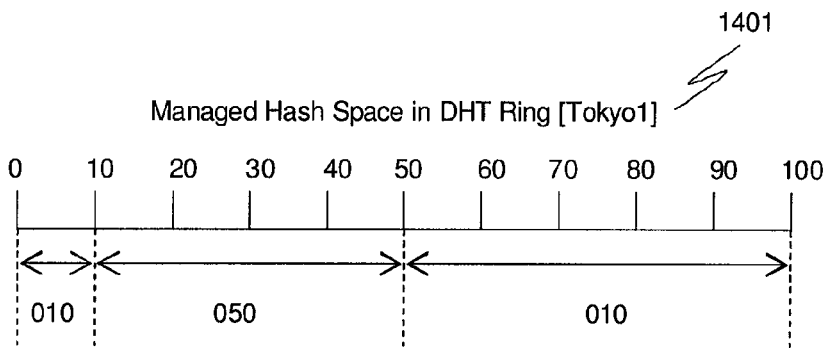
FIG. 14: Example of Managed Hash Space in Local DHT Ring
| ISP Name | Nodes in This ISP | Parent ISP Name |
|---|---|---|
| Tokyo1 | 010, 050 | Tokyo |
FIG. 15: ISP Node Table

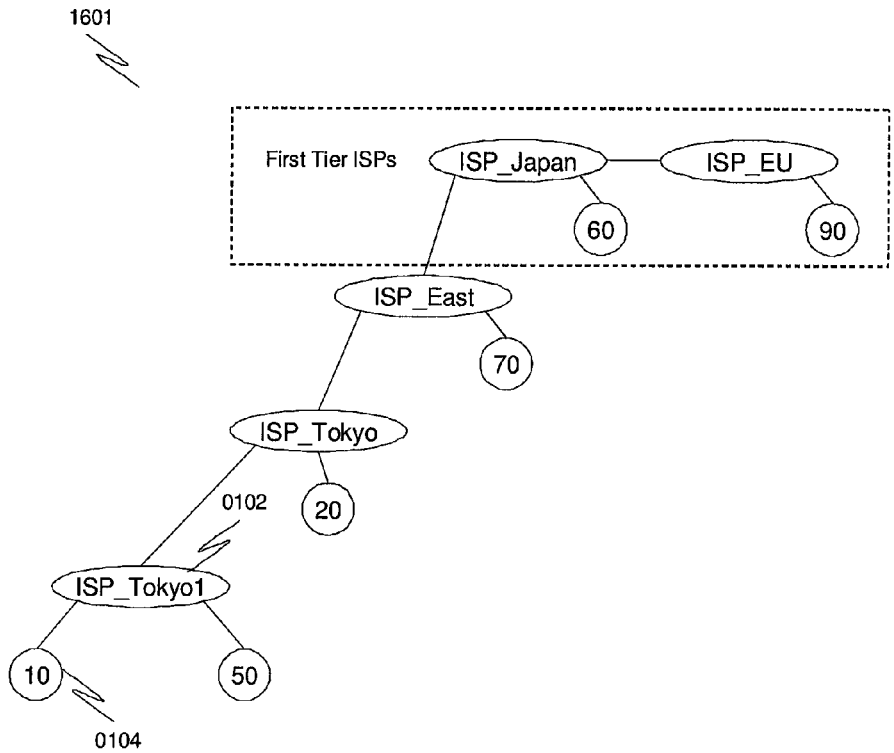
FIG. 16: Example of Hierarchical Topology of ISPs
| File Name | Hashed ID | # of Replications | ISP Name |
|---|---|---|---|
| FILE001 | 35 | 3 | Tokyo1 |
| FILE088 | 49 | 2 | East |
| FILE122 | 22 | 4 | Japan |
| FILE777 | 12 | 2 | Tokyo1 |
| FILE912 | 28 | 4 | Tokyo1 |
FIG. 17: Metadata Table

| Hashed ID | Path Name | Permission | ACL | # of Replications | Modified Time |
|---|---|---|---|---|---|
| 35 | /dir1/dir2/fileA | ReadWrite | User1, User2 | 3 | 2008/09/10 12:30:45 |
| 12 | /dir3/dir8/fileB | ReadOnly | User1 | 2 | 2008/07/12 09:10:21 |
| 28 | /dir1/dir5/fileC | AppendOnly | User3, User4 | 4 | 2008/01/23 13:40:09 |

FIG. 18: Object Management Table

| Network Storage Name | Resource ID | Hashed LUN | Mount Point |
|---|---|---|---|
| DiskArray01 | LU099 | 13 | /dir1 |
| DiskArray02 | LU012 | 33 | /dir2 |
| NAS02 | /sharefolder3 | 49 | /dir3 |

FIG. 19: LU Management Table

| IP Address of New Node | 192.168.1.10 |
| This ISP Name | Tokyo1 |
| Parent ISP Name | Tokyo |

FIG. 20: Parameters for Create New System

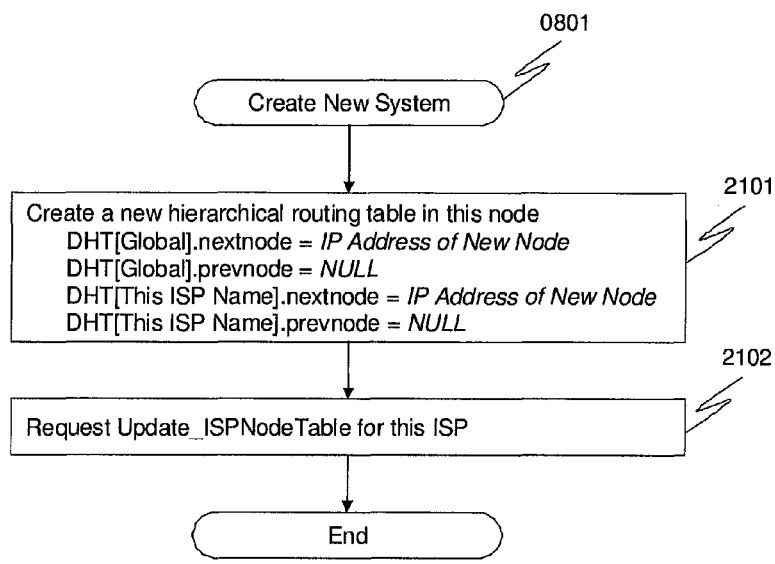
FIG. 21: Flow Chart of Create New System
FIG. 22: Parameters for Update_ISPNodeTable

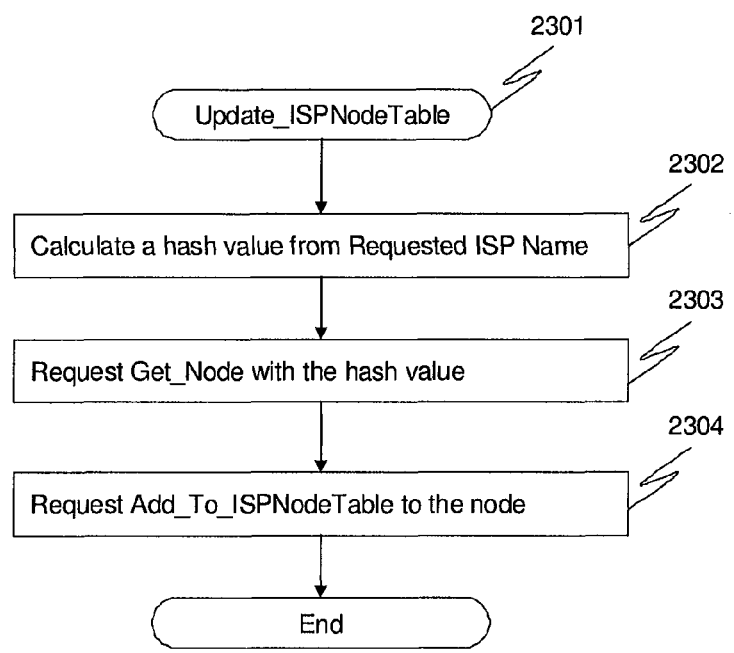
FIG. 23: Flow Chart of Update_ISPNodeTable
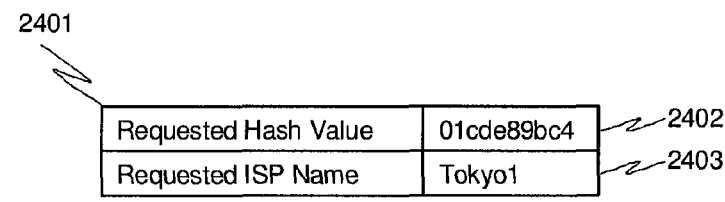
FIG. 24: Parameters for Get_Node

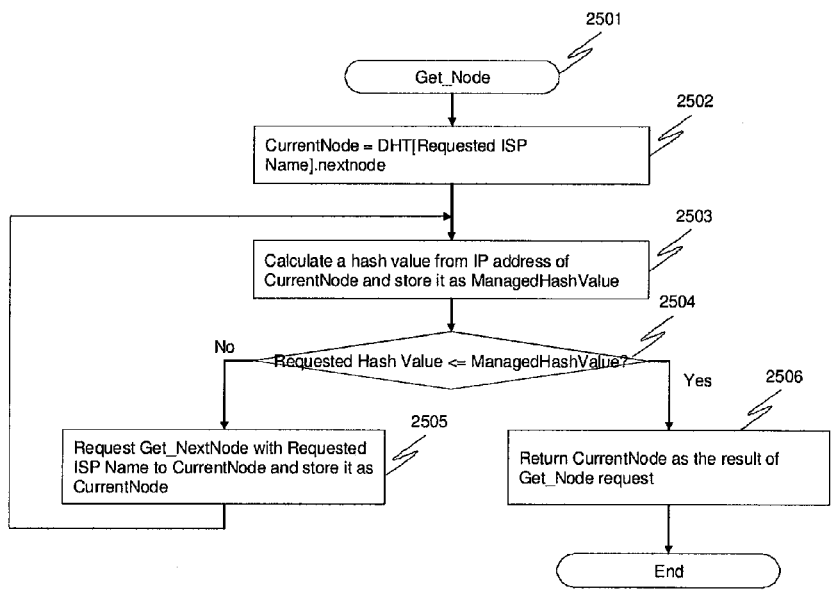
FIG. 25: Flow Chart of Get_Node
| Requested ISP Name | Tokyo1 |
| IP Address of New Node | 192.168.1.10 |
| Parent ISP Name | Tokyo |
FIG. 26: Parameters for Add_To_ISPNodeTable

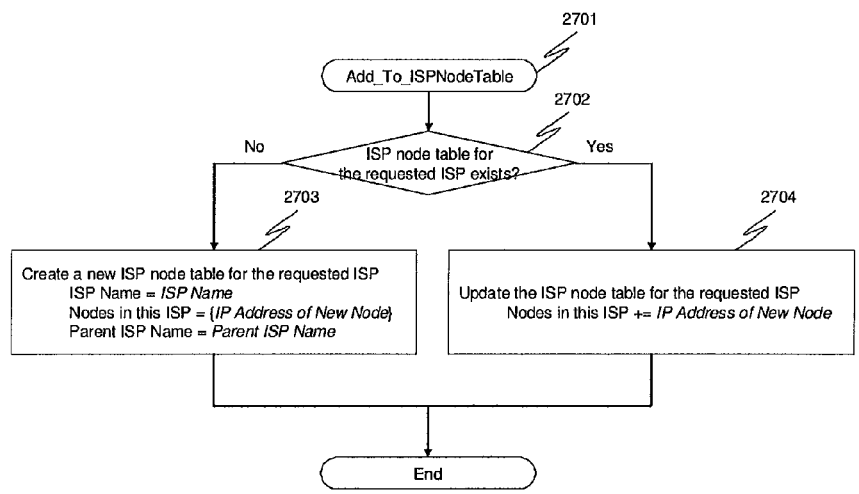
FIG. 27: Flow Chart of Add_To_ISPNodeTable
| IP Address of New Node | 192.168.1.50 | 2802 |
| This ISP Name | Tokyo1 | 2803 |
| Parent ISP Name | Tokyo | 2804 |
| Existing Node | 192.168.1.10 | 2805 |
FIG. 28: Parameters for Join To System

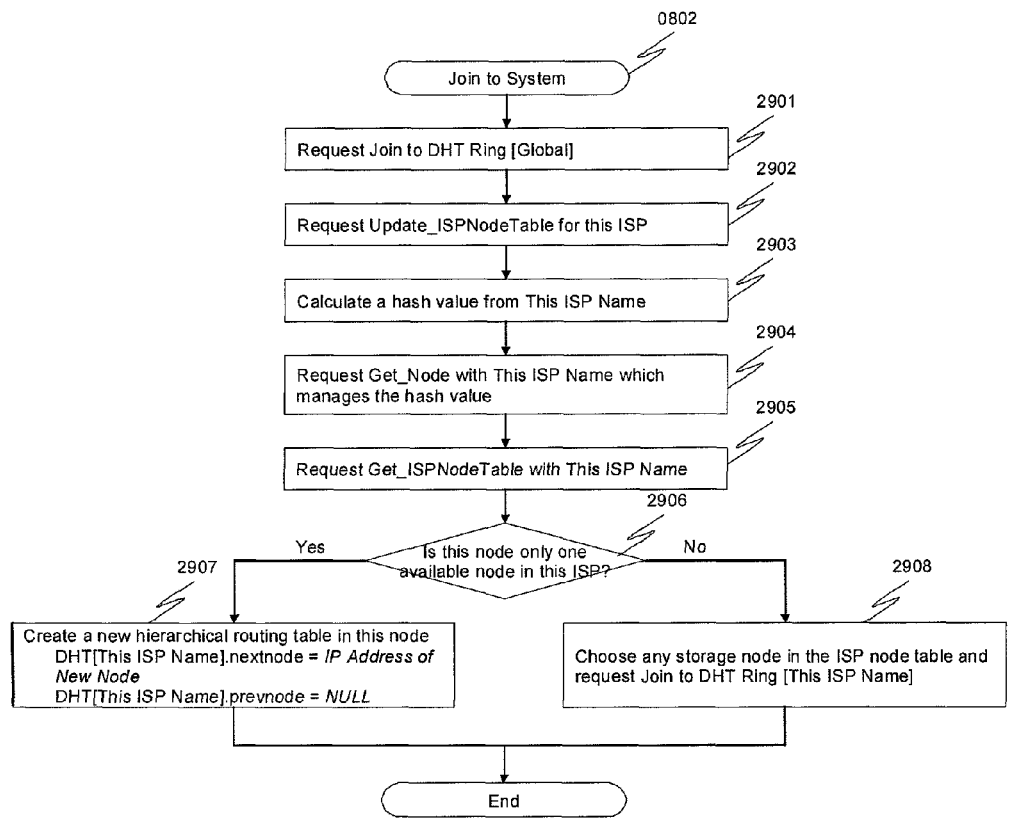
FIG. 29: Flow Chart of Join To System
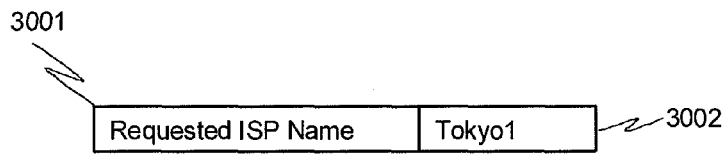
FIG. 30: Parameters for Get_NextNode

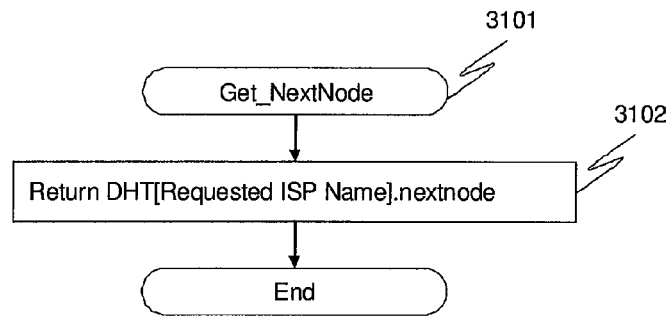
FIG. 31: Flow Chart of Get_NextNode
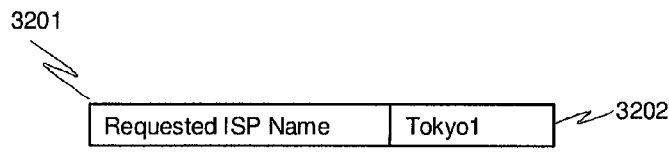
FIG. 32: Parameters for Get_PrevNode
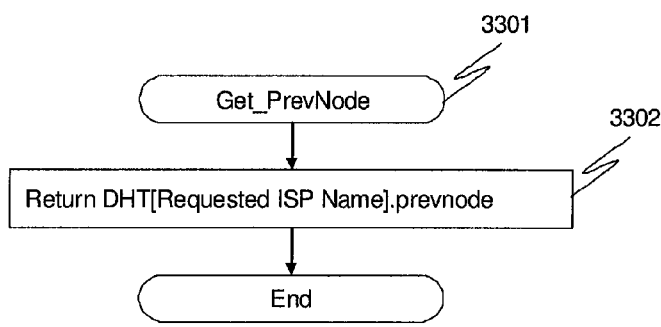
FIG. 33: Flow Chart of Get_PrevNode
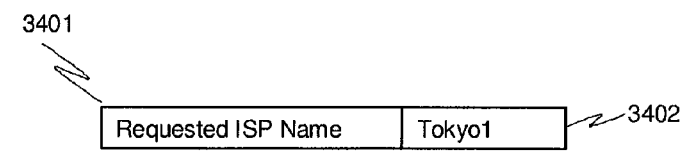
FIG. 34: Parameters for Get_ISPNodeTable

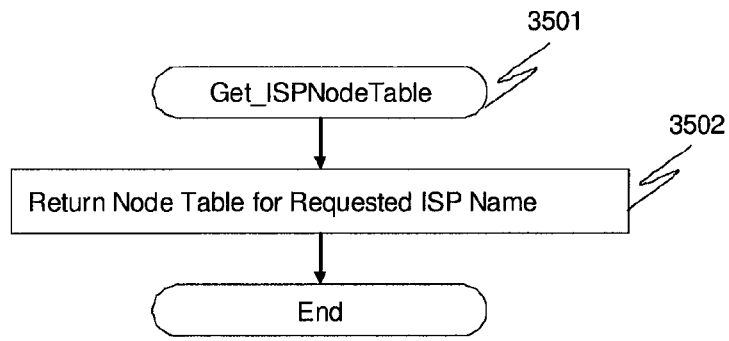
FIG. 35: Flow Chart of Get_ISPNodeTable
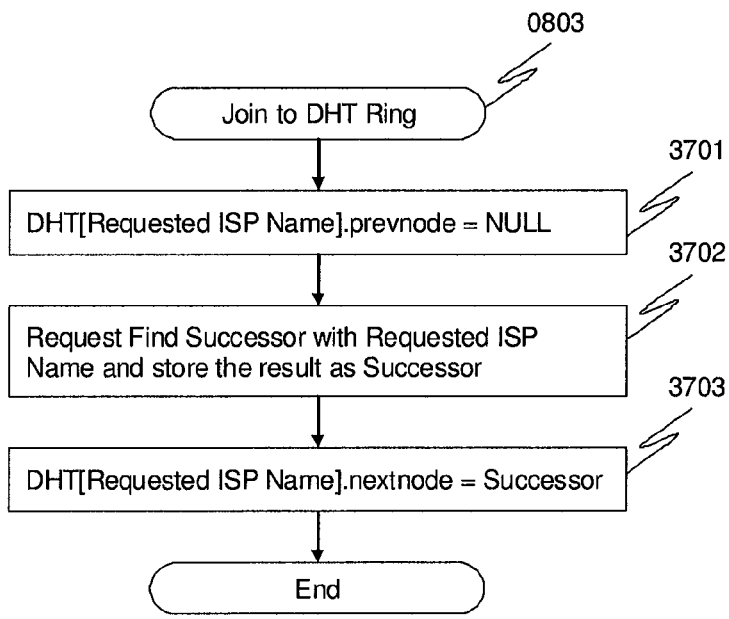
FIG. 36: Parameters for Join to DHT Ring
FIG. 37: Flow Chart of Join to DHT Ring

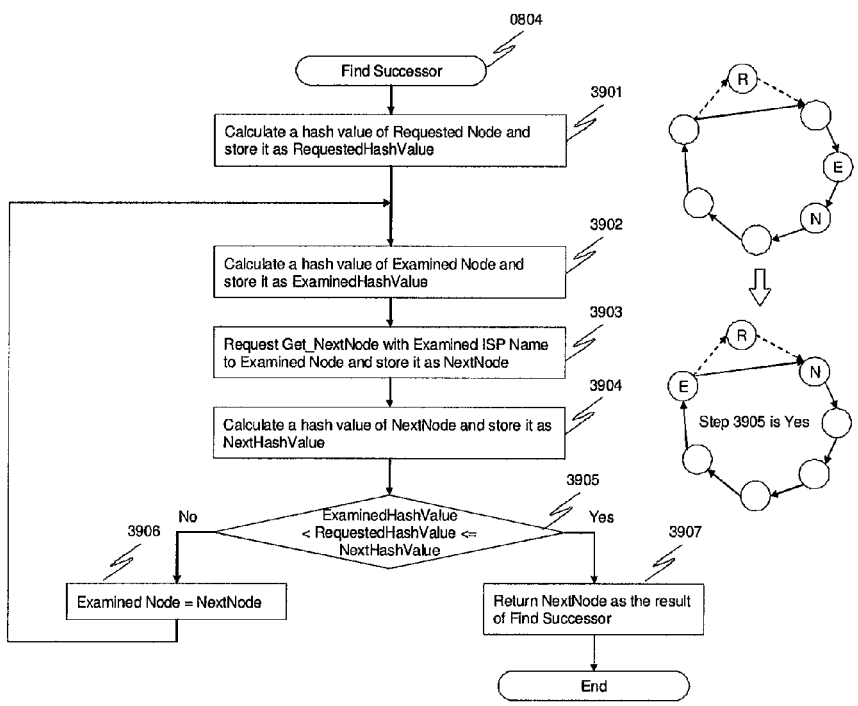
3801
| Requested ISP Name | Tokyo1 | 3802 |
| IP Address of Requested Node | 192.168.1.50 | 3803 |
| IP Address of Examined Node | 192.168.1.10 | 3804 |
FIG. 38: Parameters for Find Successor
FIG. 39: Flow Chart of Find Successor

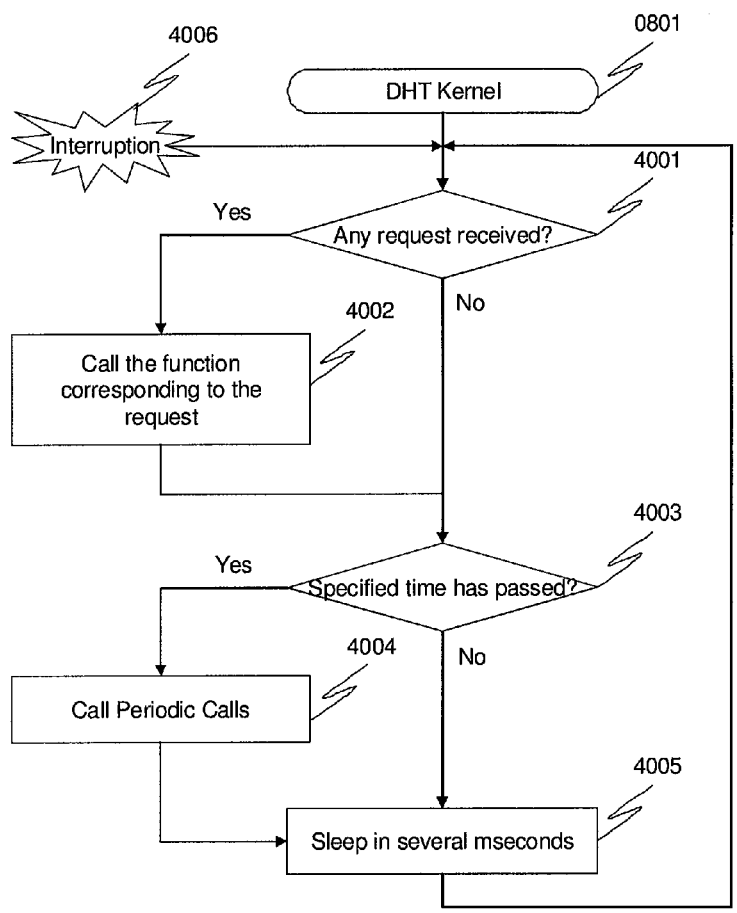
FIG. 40: Flow Chart of DHT Kernal

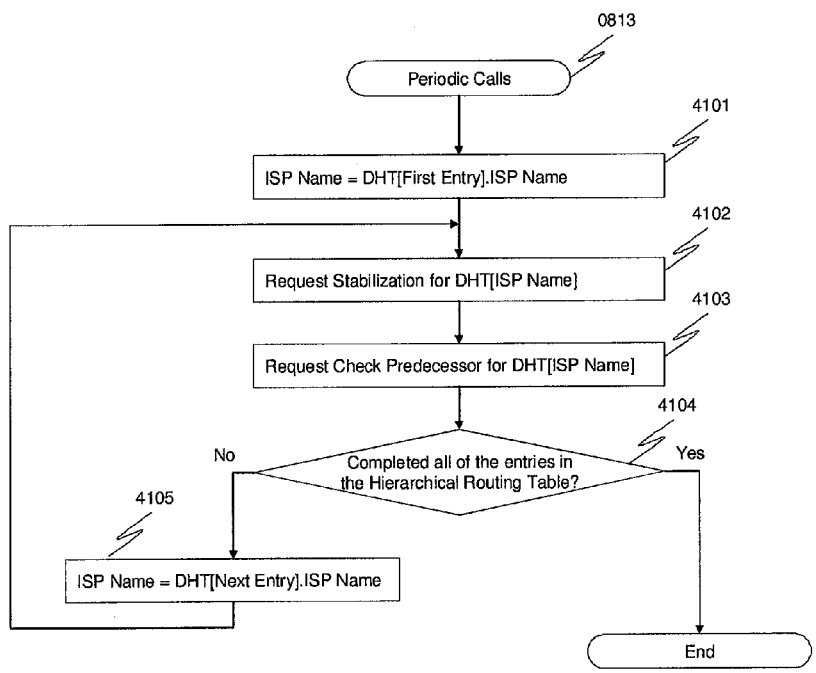
FIG. 41: Flow Chart of Periodic Calls
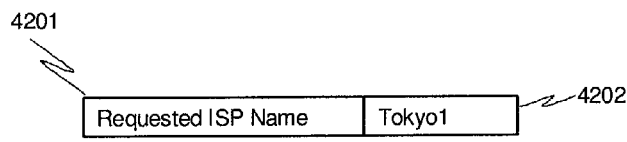
FIG. 42: Parameters for Stabilization

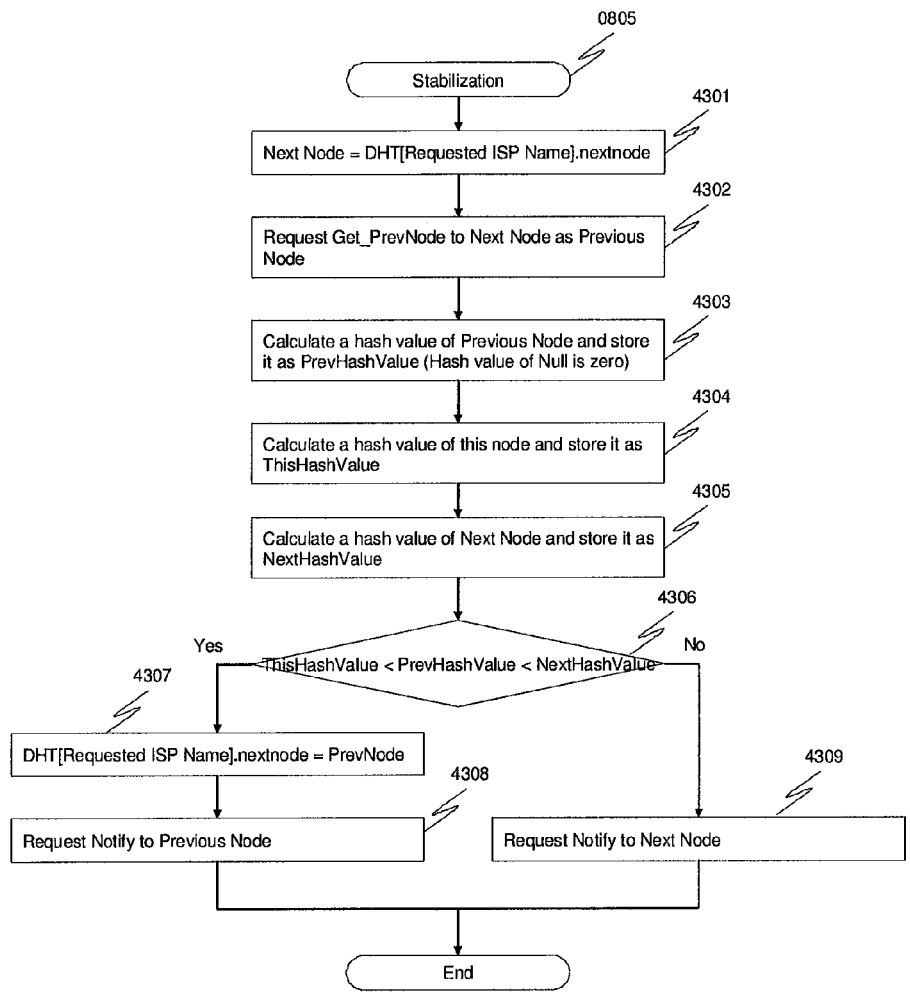
FIG. 43: Flow Chart of Stabilization
FIG. 44: Parameters for Notify

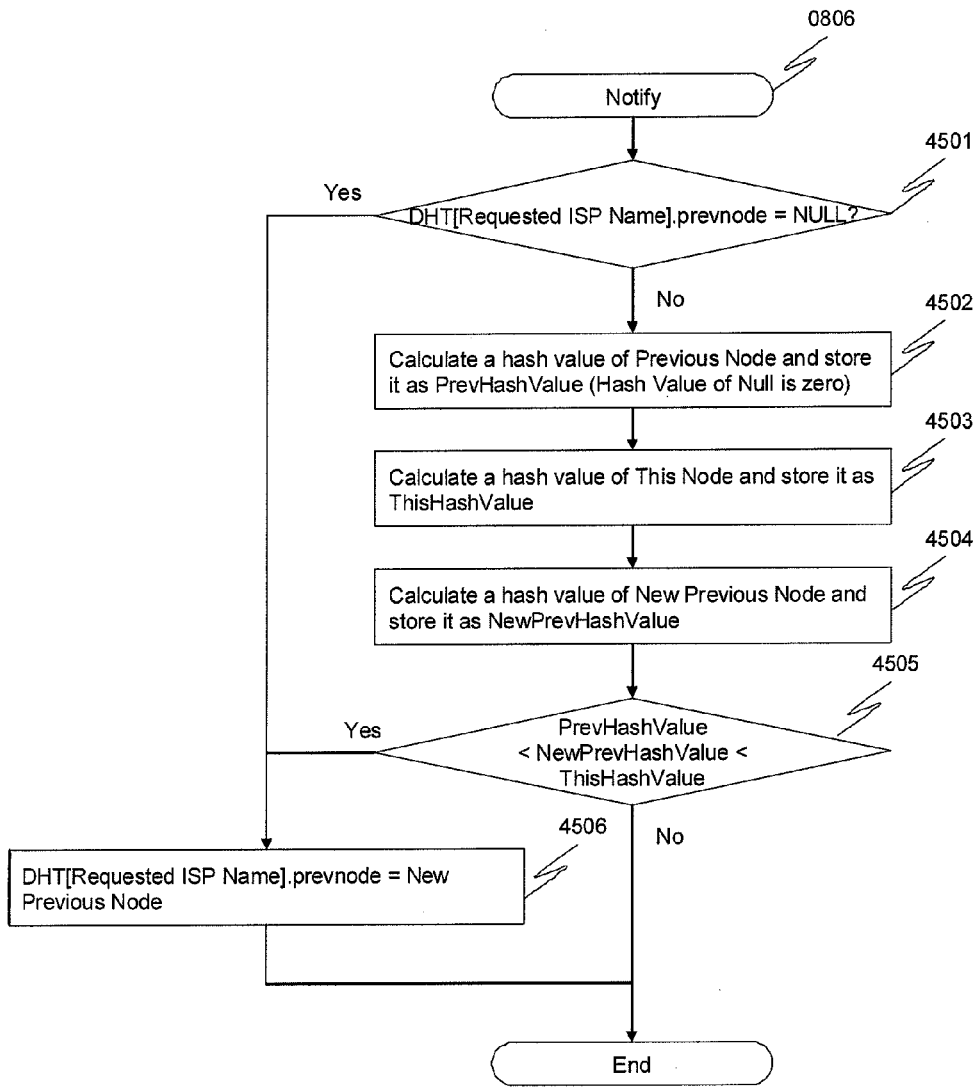
FIG. 45: Flow Chart of Notify
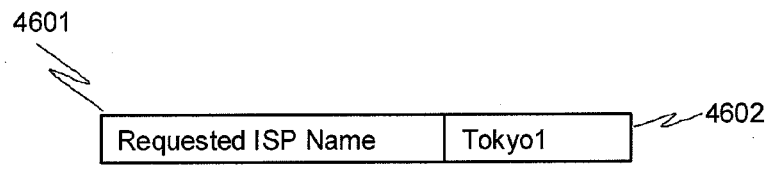
FIG. 46: Parameters for Check Predecessor

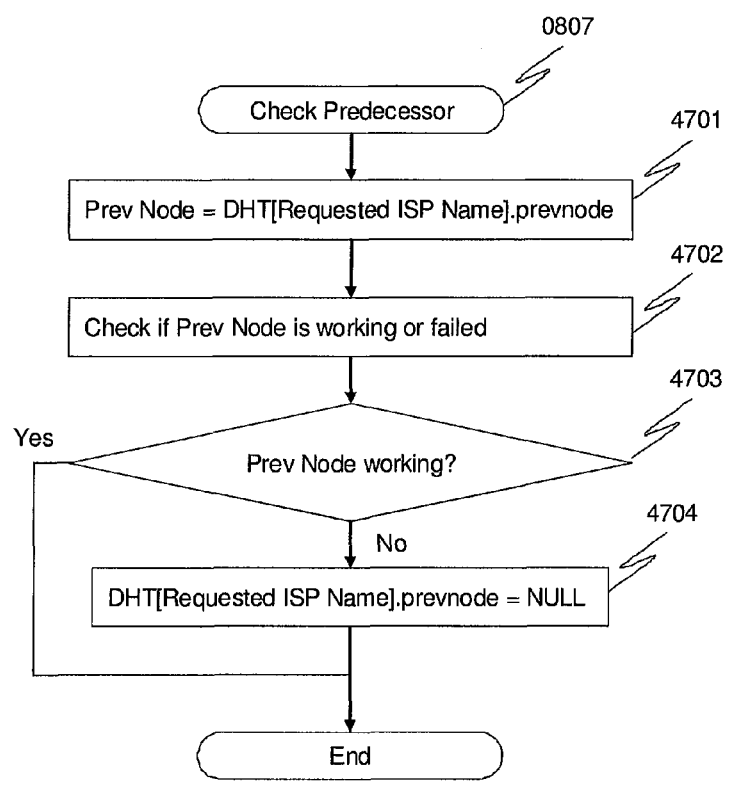
FIG. 47: Flow Chart of Check Predecessor

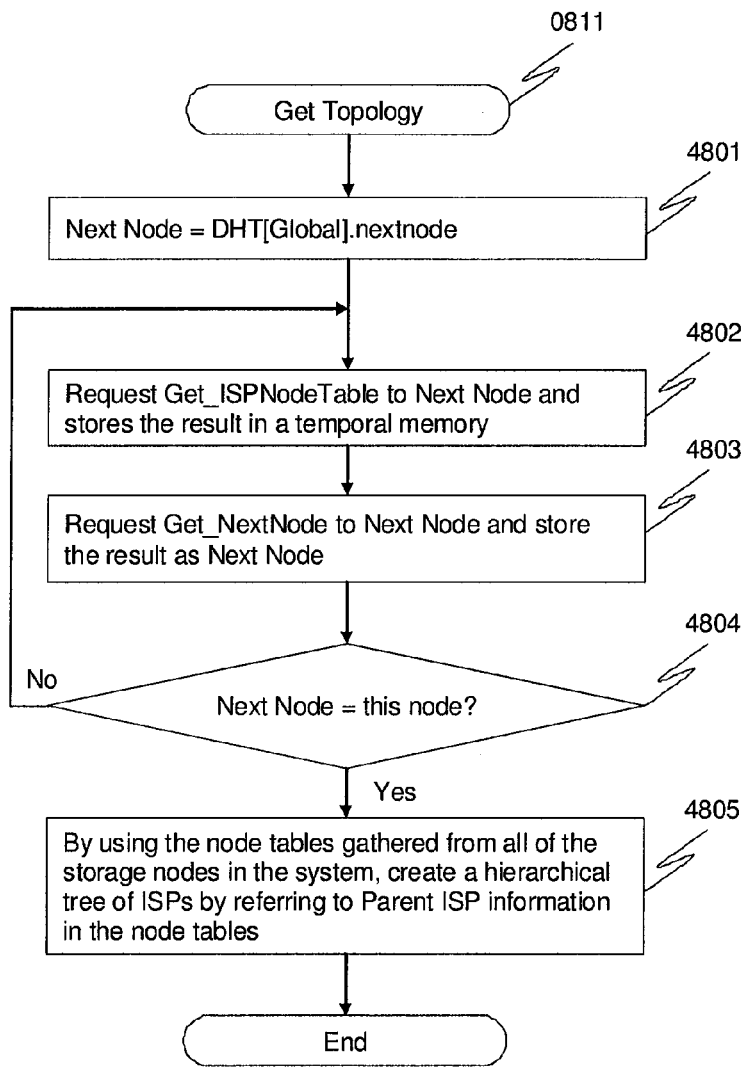
FIG. 48: Flow Chart of Get Topology
FIG. 49: Parameters for Change Topology

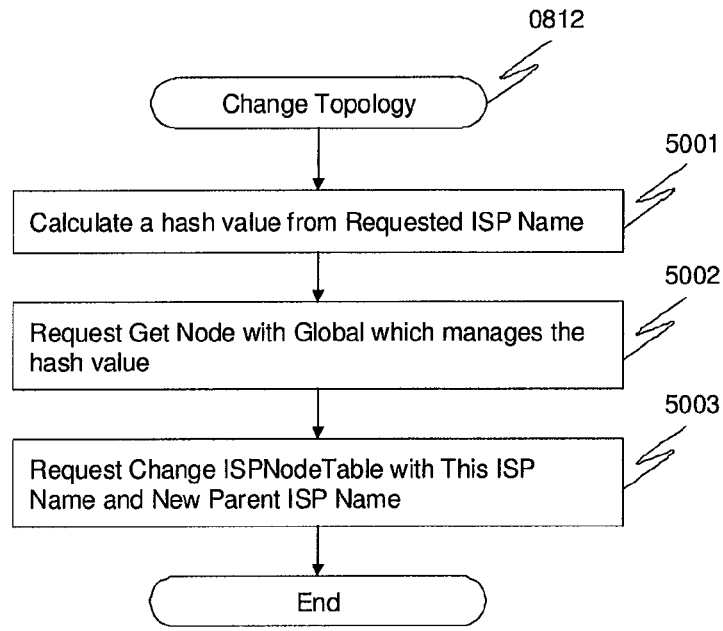
FIG. 50: Flow Chart of Change Topology
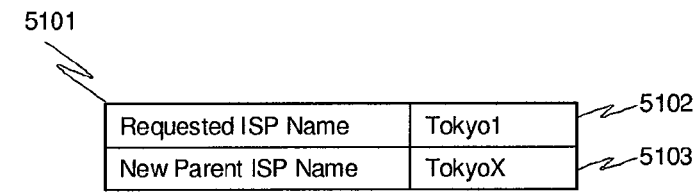
FIG. 51: Parameters for Change_ISPNodeTable
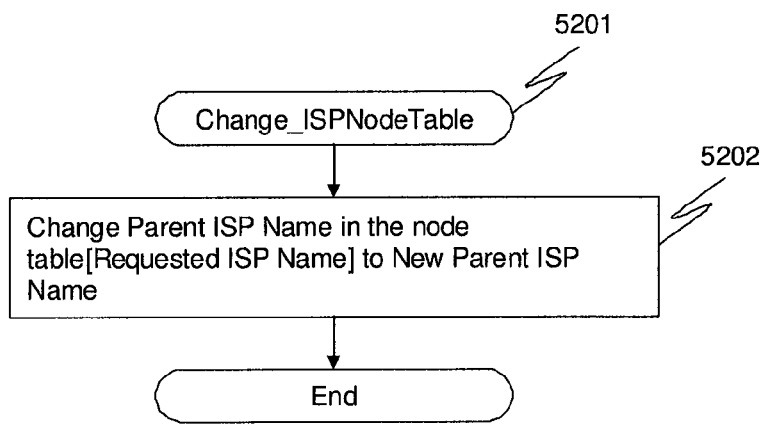
FIG. 52: Flow Chart of Change_ISPNodeTable

5301

| Request Type | Put File | 5302 |
| Requested ISP Name | Tokyo1 | 5303 |
| File Name | File001 | 5304 |
| Permission | ReadWrite | 5305 |
| ACL | User1 | 5306 |
| # of Replications | 3 | 5307 |
| File Data | | 5308 |

FIG. 53: Parameters for Put File

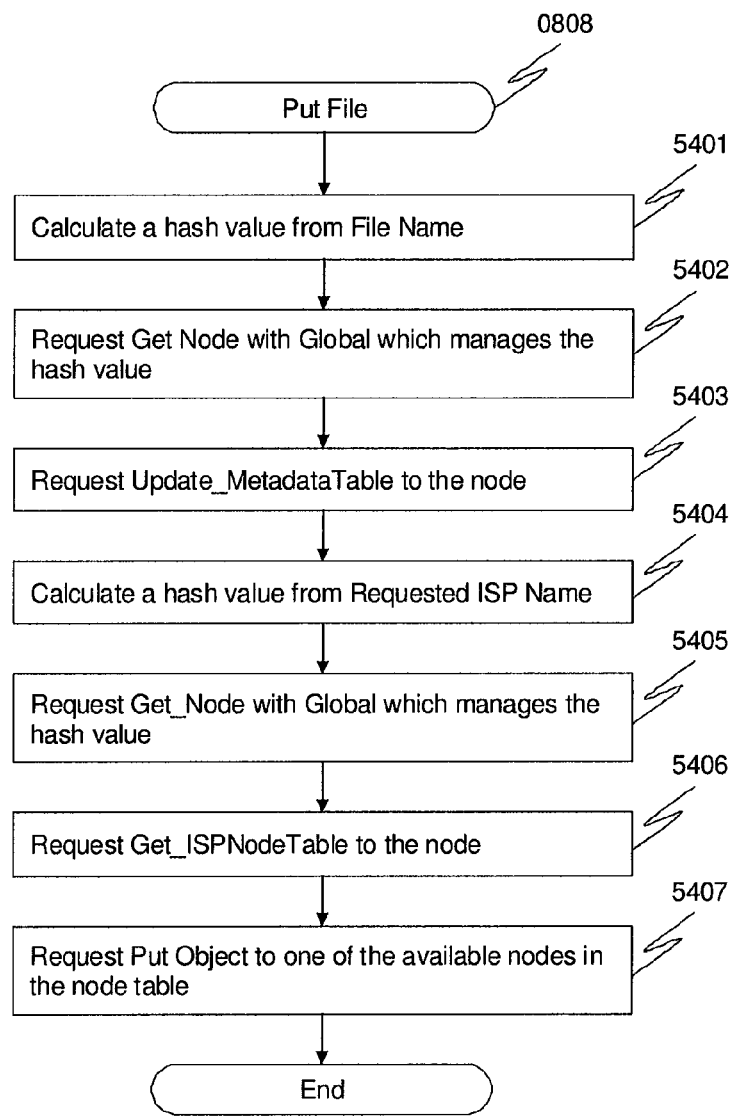
FIG. 54: Flow Chart of Put File

5501

| Requested ISP Name | Tokyo1 | 5502 |
| --- | --- | --- |
| File Name | File001 | 5503 |
| # of Replications | 3 | 5504 |

FIG. 55: Parameters for Update_Metadata

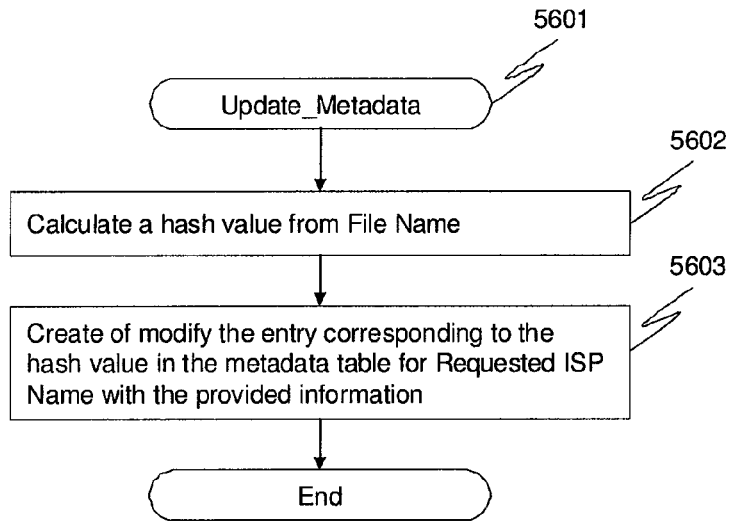

5601 Update_Metadata

5602 Calculate a hash value from File Name

5603 Create of modify the entry corresponding to the hash value in the metadata table for Requested ISP Name with the provided information End FIG. 56: Flow Chart of Update_Metadata

5701

| Request Type | Put Object | 5702 |
| --- | --- | --- |
| Hash Value | 23 | 5703 |
| Requested ISP Name | Tokyo1 | 5704 |
| Permission | ReadWrite | 5705 |
| ACL | User1 | 5706 |
| # of Replications | 3 | 5707 |
| Object Data |  | 5708 |

FIG. 57: Parameters for Put Object

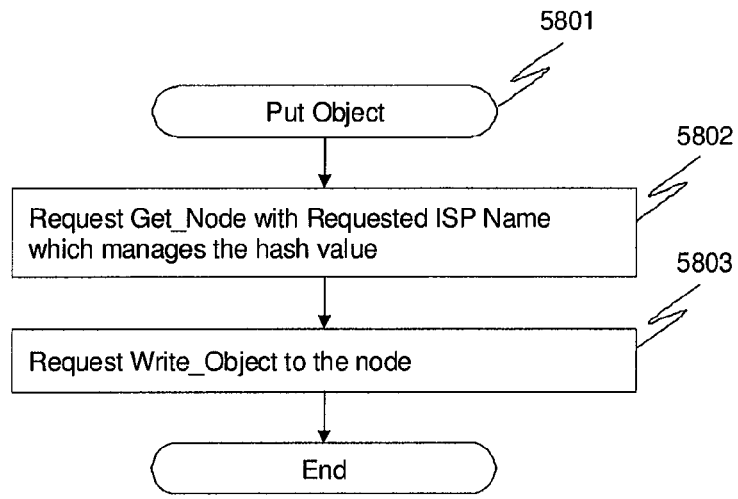
FIG. 58: Flow Chart of Put Object
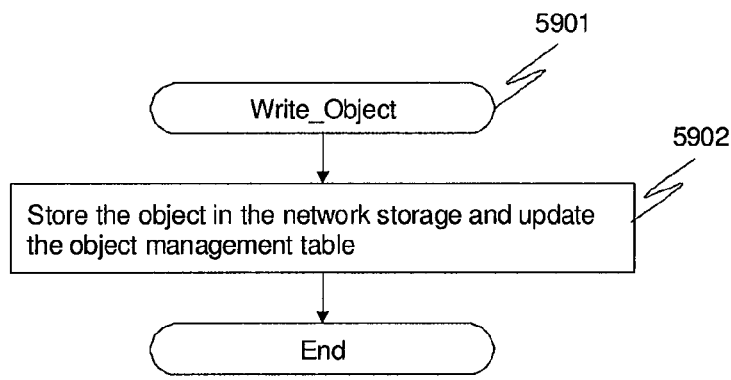
FIG. 59: Flow Chart of Write_Object
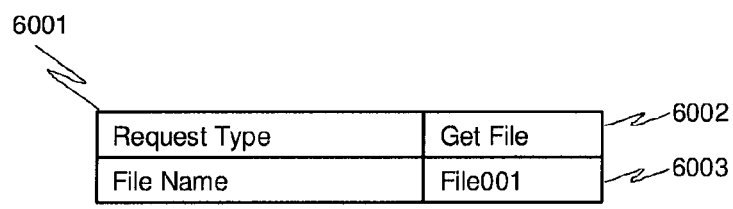
FIG. 60: Parameters for Get File

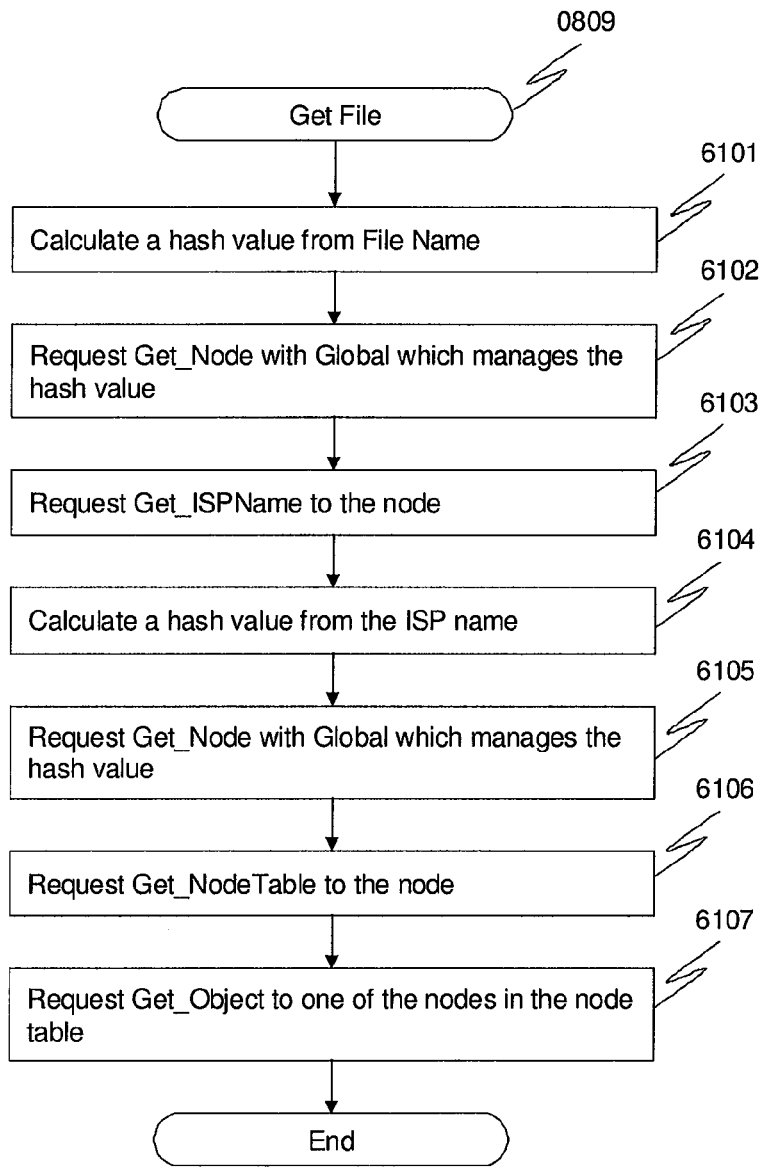
FIG. 61: Flow Chart of Get File
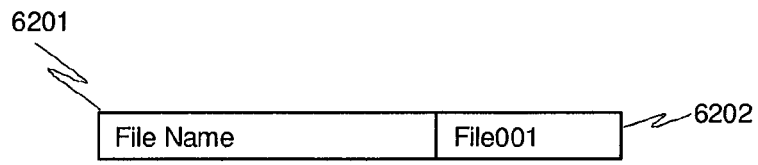
FIG. 62: Parameters for Get_ISPName

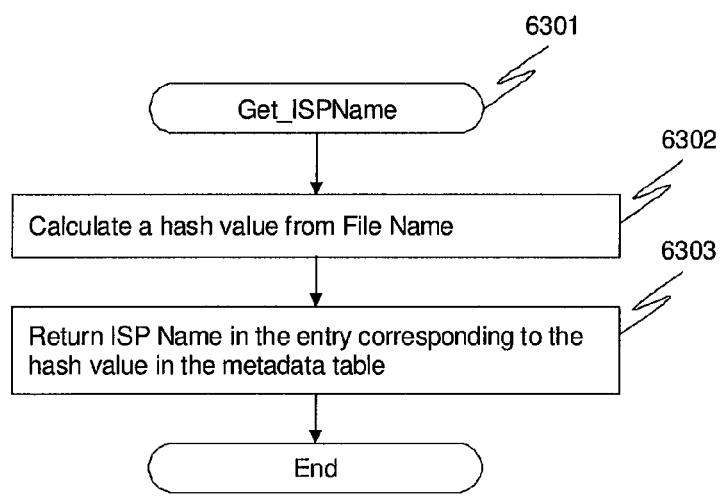
FIG. 63: Flow Chart of Get_ISPName
| Request Type | Get Object | 6402 |
| Hash Value | 23 | 6403 |
| Requested ISP Name | Tokyo1 | 6404 |
6401
FIG. 64: Parameters for Get Object

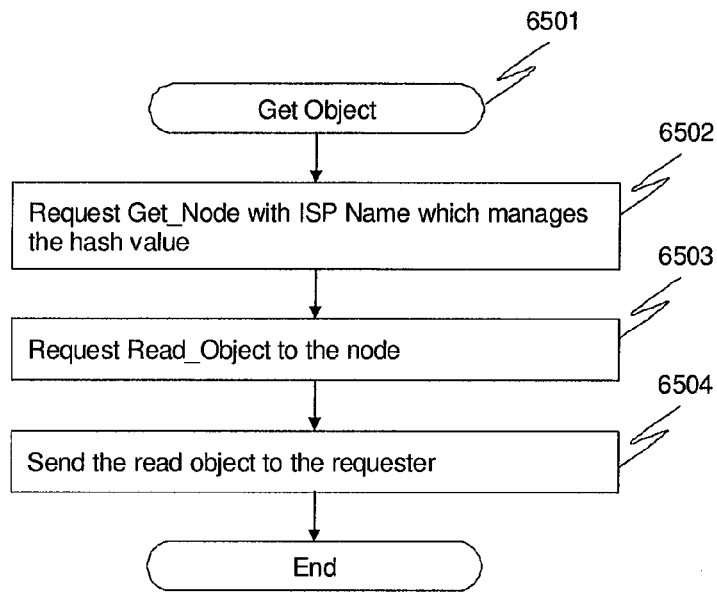
FIG. 65: Flow Chart of Get Object
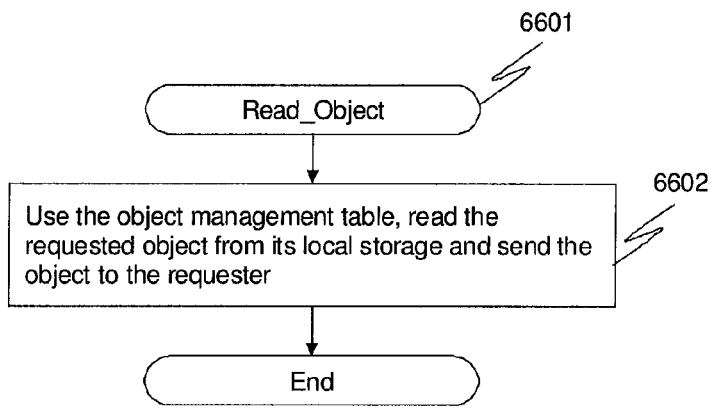
FIG. 66: Flow Chart of Read_Object
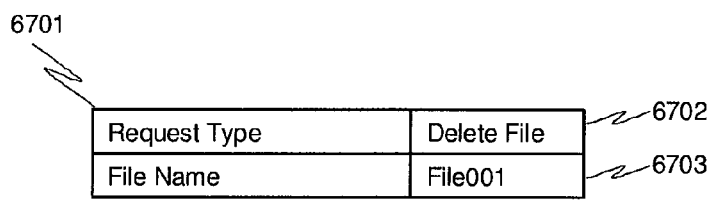
FIG. 67: Parameters for Delete File

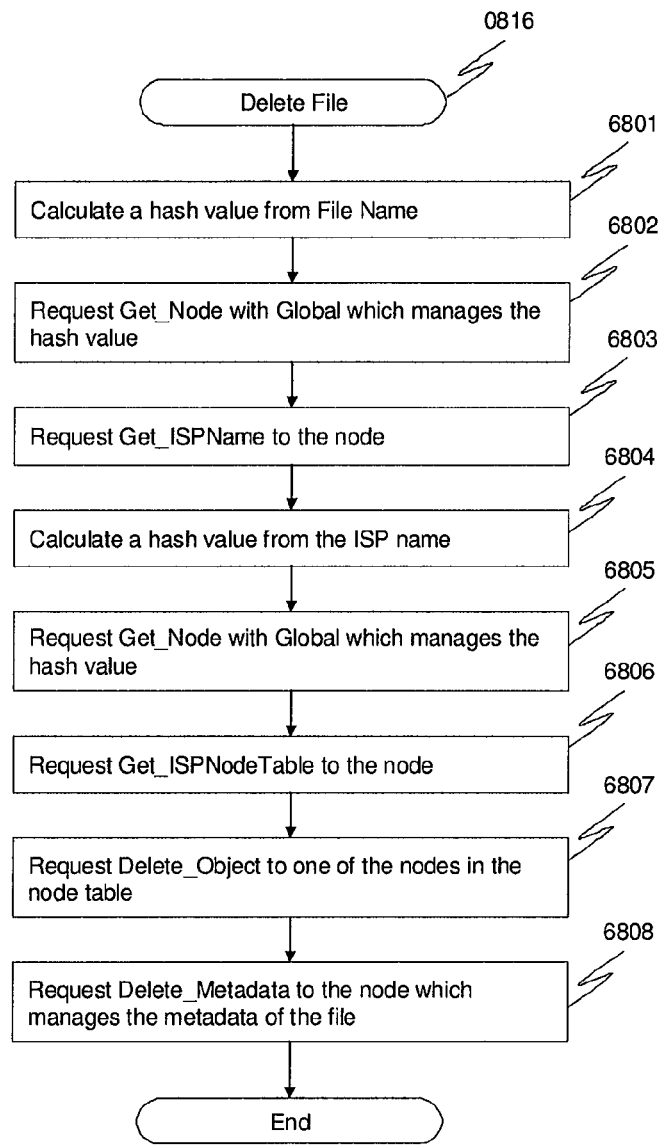
FIG. 68: Flow Chart of Delete File
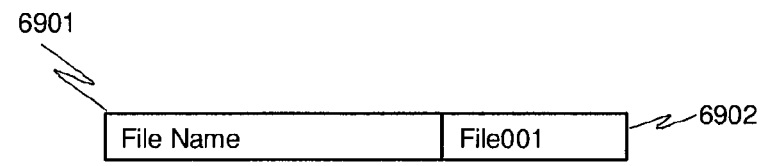
FIG. 69: Parameters for Delete_Metadata

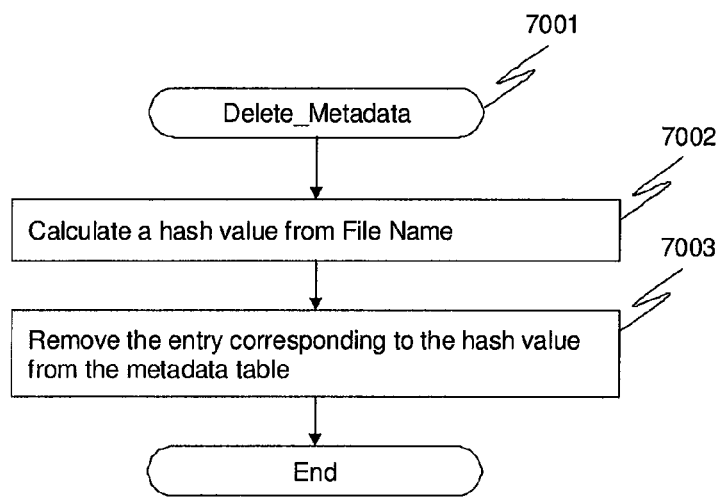
FIG. 70: Flow Chart of Delete_Metadata
FIG. 71: Parameters for Delete Object

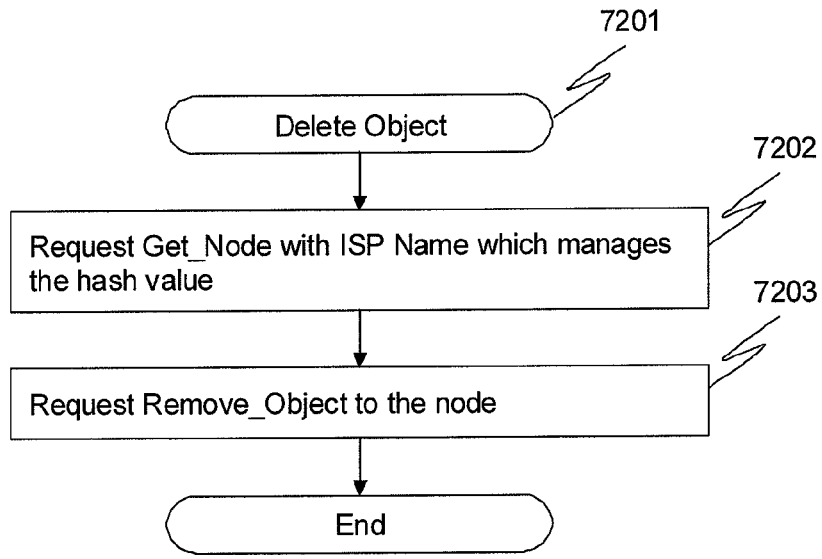
FIG. 72: Flow Chart of Delete Object
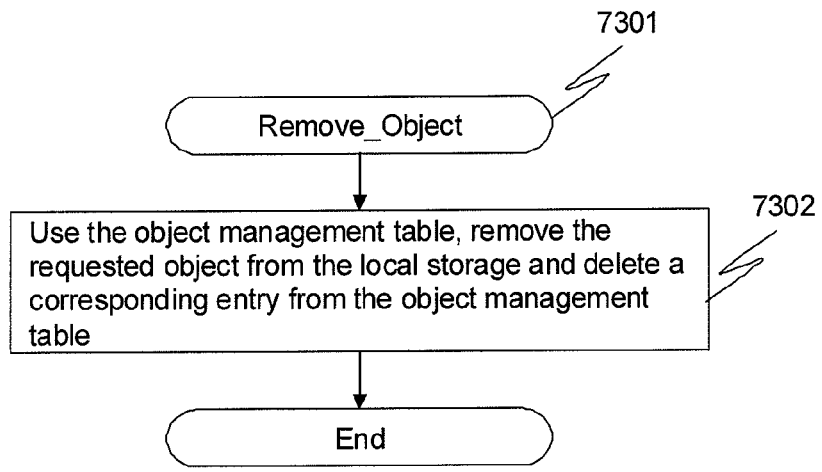
FIG. 73: Flow Chart of Remove_Object
| Request Type | Move |
|---|---|
| File Name | File001 |
| New ISP Name | East |
FIG. 74: Parameters for Move File

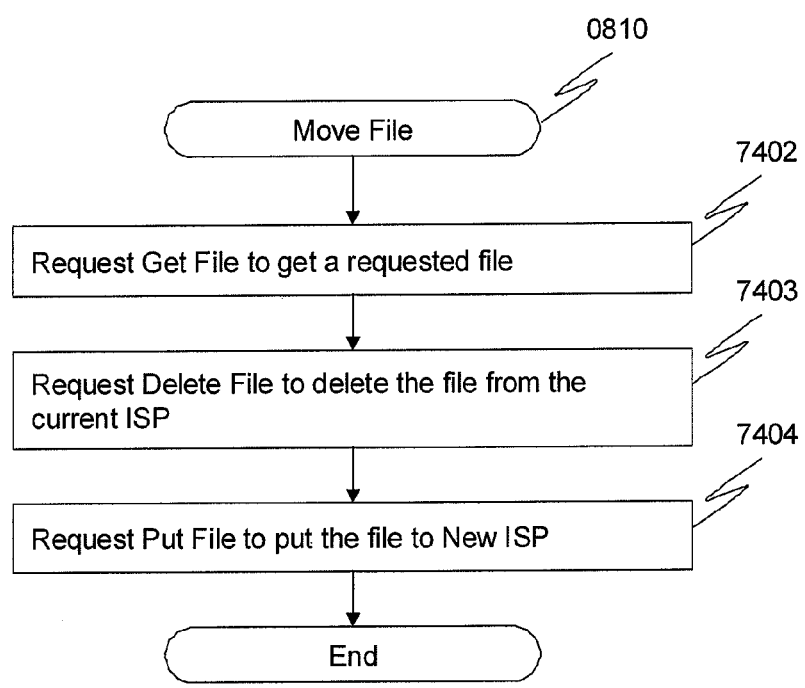
FIG. 75: Flow Chart of Move File

GEOGRAPHICAL DISTRIBUTED STORAGE SYSTEM BASED ON HIERARCHICAL PEER TO PEER ARCHITECTURE

BACKGROUND OF THE INVENTION

The present invention relates generally to a distributed storage system. More particularly, the present invention relates to a geographically distributed storage system configured to have a hierarchical peer to peer (P2P) architecture.

In the era of Web Computing, highly scalable storage systems are needed. Such a storage system needs to meet the demands for storing and accessing information, wherein such demands increase exponentially because web services typically start from a small number of users and expand rapidly when the services are known by other users around the world. Due to this characteristic of web computing, such a storage system needs to be scalable from multiple perspectives including performance, capacity, manageability, and so on.

Geographically distributed storage systems are required in order to reduce usages of network bandwidth, reduce response time to access data, increase availability of services, and so on. In a case where storage systems are located at multiple geographical locations, it becomes much more difficult to design, install, manage and maintain the system compared with a storage system located in one location. Traditional storage systems require a large number of highly skilled engineers working at the site of the storage systems. However, it is too expensive to employee so many engineers and successfully continue the business because customers do not pay a lot for just storing and accessing data. Thus, it is necessary for storage services to be provided with less labor costs.

Peer to peer (P2P) file sharing technology can be used to reduce such labor costs dramatically. Typical P2P software is installed in each personal computer at home and used for sharing files among tens of thousands of computers around the world. Such computers are called, nodes. Files are replicated and stored in multiple nodes. However, even if some number of nodes have been turned off or have failed, users can still continue to use the file sharing service on the nodes that are still on or that have not failed. There is no central control server or dedicated administrator or highly skilled engineer to maintain the service.

Traditional P2P technology is not concerned with the physical locations of the nodes or network connectivity among the nodes. Because of this, network bandwidth is not used efficiently. For example, when one user living in Japan has requested to read a file, the file might have been stored in and be transferred from a node on the other side of the world such as Brazil via an expensive submerged cable. Networking traffic caused by P2P has been consuming a large part of network bandwidth for some years and this has been a big problem for internet service providers (ISPs). Some ISPs decided to restrict the use of P2P software or charge more for such use. It is an important problem for ISPs to reduce networking traffic caused by P2P software.

When geographically distributed storage systems adopt P2P technology as a basic architecture for managing the storage systems, the same problem as to P2P file sharing will occur. It is demanded by online storage service providers to store files in the location where the files are accessed frequently so the files are accessed within a local network so as not to cause unnecessary network traffic across the Internet.

There are some prior arts disclose the use of P2P technology with data location control. The following three US published patent applications are examples of such techniques.

US Patent Application Publication No. 2004/0085329A1 discloses a system by which each node measures latencies of communications from the landmark nodes, the system groups the nodes which have similar latencies to the landmark nodes and the system stores files among the nodes in the specific group. It is assumed that the nodes in a group can be considered to be located in the same location if the measured latencies are close to each other. However this assumption is not always correct because latency may vary depending on network conditions. Alternative methods to group nodes which are located in same location is required.

US Patent Application Publication Nos. 2004/0249970A1 and 2004/0054807A1 disclose a system by which an administrator specifies a location of each node and a hierarchical organizational topology of the locations in manual and the system groups the nodes within same location, create a hierarchical topology among the groups and stores data among the nodes in the specific location. It is assumed that the hierarchical topology among the nodes has been already known by the administrator. However when the number of the nodes in the system becomes very large and the number of the locations has also increased, it is difficult to know the updated topology information around the Internet. Alternative method to create a hierarchical topology among the groups is required.

SUMMARY OF THE INVENTION

The present invention provides a geographically distributed storage system configured to have a hierarchical P2P architecture system.

The present invention discloses a system by which groups nodes at the same locations, creates a topology among the groups by using partial network topology information about locations and store files within the nodes in a specific group. As the result, the system can provide an easier way to configure hierarchical P2P topology and reduce networking traffic.

The system according to the present invention has two types of P2P subsystems, a global P2P ring and one or more local P2P rings. The global P2P ring includes all of nodes in the system and the local P2P rings each includes only storage nodes at the same location.

The global P2P ring manages a network relationship between two locations and constructs a hierarchical topology of the locations based on the network relationships. The network relationship is provided when a new node is added to the system. An administrator at one location gives a name of the location in which a new node is located and a name of other locations which is directly connected from the location. A client of the system uses the topology information in order to decide at which location a file is stored.

All files are stored within the global P2P ring or a local P2P ring and the global P2P ring also manages locations of files and a list of nodes in each location. When a node accesses to a file, the node asks the global P2P ring for information of the location of the file and at least one node in the location. Then the node that asked for the information asks the at least one node in the location to get the file from the location. The local P2P ring manages which node in the local P2P ring stores which files.

Regarding to the problem described in US Patent Application Publication No. 20040085329A1, according to the present invention when a new node is connected to the system, an administrator at each location gives a name of an ISP in which a node is located so the system groups the nodes with same ISP name. Because it is not a difficult task for an administrator to know to which ISP the new node is connected, the system can group the nodes accurately compared with using latency information.

Regarding to the problem described in US Patent Application Publication Nos. 20040249970A1 and 20040054807A1, according to the present invention when a new node is connected to the system, an administrator at each location gives a name of a parent ISP of an ISP to which a new node is connected as a partial information about the topology. The system creates a hierarchical P2P topology by using the partial information. It is not a difficult task for an administrator to know to which parent ISP the ISP is connected because the ISP and its parent ISP have a business relationship in order to connect transition network each other. This invention does not require any whole network topology information around the world so this invention is much more applicable and feasible to implement.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 1 shows an overall system configuration for the geographically distributed storage system (GDSS) 0101 according to the present invention;

FIG. 2 shows more details about the system configuration within an ISP 0102;

FIG. 3 shows one example of implementations of storage nodes;

FIG. 4 shows another example of the implementations of storage nodes;

FIG. 5 shows yet another example of the implementations of storage nodes;

FIG. 6 shows an internal hardware configuration of a storage node head 0301;

FIG. 7 shows an internal hardware configuration of a storage node 0104;

FIG. 8 shows programs 0801 to 0814, 0816 running in a storage node 0104 or a storage node head 0301 and tables 0815, 0109, 0110, 0112 and 0113 used by the programs;

FIG. 9 shows a hierarchical routing table 0815;

FIG. 10 shows an example of a global Distributed Hash Table (DHT) ring 0105;

FIG. 11 shows an example of a relationship between an IP address 1101, a hash value calculated from the Internet Protocol (IP) address 1102 and a storage node Identifier (ID) 1103;

FIG. 12 shows an example of a managed hash space 1201 in DHT ring [Global];

FIG. 13 shows an example of a managed hash space in global DHT ring 0107 [Tokyo1];

FIG. 14 shows an example of a managed hash space in global DHT ring 0107 [Tokyo1];

FIG. 15 shows an ISP node table 0109 managed in the global DHT ring 0105;

FIG. 16 shows an example of a hierarchical topology 1601 among ISPs;

FIG. 17 shows a metadata table 0110 managed in the global DHT ring 0105;

FIG. 18 shows an object management table 0112 managed in a global DHT ring 0107;

FIG. 19 shows a Logical Unit (LU) management table managed by a storage node;

FIGS. 20 and 21 show a Create New System 0801 function of a storage node;

FIGS. 22 and 23 show an Update_ISPNodeTable sub function 2301;

FIGS. 24 and 25 show a Get_Node sub function 2501;

FIGS. 26 and 27 show an Add_To_ISPNodeTable sub function 2701;

FIG. 28 shows a Join to System function;

FIG. 29 shows a flow chart of Join to System function 0802;

FIGS. 30 and 31 show a Get_NextNode sub function 3101;

FIGS. 32 and 33 show a Get_PrevNode sub function 3301;

FIGS. 34 and 35 show a Get_ISPNodeTable sub function 3301;

FIGS. 36 and 37 show a Join to DHT Ring function 0803;

FIGS. 38 and 39 show a Find Successor function 0804;

FIG. 40 shows a flow chart of DHT Kernel 0814;

FIG. 41 shows a flow chart of Periodic Calls function 0813;

FIGS. 42 and 43 show a Stabilization function 0805;

FIGS. 44 and 45 show a Notify function 0806;

FIGS. 46 and 47 show a Check Predecessor function 0807;

FIG. 48 shows a Get Topology function 0811;

FIGS. 49 and 50 show a Change Topology function 0812;

FIGS. 51 and 52 show a Change ISPNodeTable function 5201;

FIGS. 53 and 54 show a Put File function 0808;

FIGS. 55 and 56 show a Update_Metadata sub function 5601;

FIGS. 57-59 show a Put Object sub function 5801;

FIGS. 60 and 61 show a Get File function 0809;

FIGS. 62 and 63 show a Get_ISPName sub function 6301;

FIGS. 64-66 show a Get Object sub function 6501;

FIGS. 67 and 68 show a Delete File function 0816;

FIGS. 69 and 70 show a Delete_Metadata sub function 7001;

FIGS. 71 and 72 show a Delete_Object sub function 7201;

FIG. 73 shows a flow chart of Remove_Object sub function 7301; and

FIG. 74 shows a Move File function 0810.

FIG. 75 shows a flow chart of a Move File.

DETAILED DESCRIPTION OF THE INVENTION

The present invention as will be described in greater detail below provides an apparatus, method and system, particularly, for example, a geographically distributed storage system configured to have a hierarchical P2P architecture system. The present invention provides various embodiments as described below. However it should be noted that the present invention is not limited to the embodiments described herein, but could extend to other embodiments as would be known or as would become known to those skilled in the art.

The geographically distributed storage system (GDSS) will be described below with respect to the accompanying drawings.

FIG. 1 shows an overall system diagram for the GDSS 0101. GDSS includes many storage nodes 0104 and each storage node 0104 is connected to one of Internet Service Providers (ISPs) 0102 around the world. ISPs are connected together via a wide area network 0103, thereby forming a part of the wide area network so as to construct the Internet, for example. Clients 0117 are also connected to ISPs and store and read files in the GDSS. A client can access to any storage node 0104 in the GDSS so it can access any data in the GDSS.

FIG. 2 shows more details about system configuration within an ISP 0102. Within the ISP 0102, there are many storage nodes 0104 and these storage nodes 0104 are connected to a Local Area Network (LAN) 0201 which is connected to routers 0202 that connect the LAN 0201 to other ISPs via network 0103.

Going back to FIG. 1, the GDSS 0101 constructs two types of logical storage systems having one global P2P ring and one or more local P2P rings. According to the present invention each of the global and local P2P rings can be a Distributed Hash Table (DHT) ring, wherein each of the storage nodes 0104 of the GDSS is identified by a Hash value. Thus, as illustrated in FIG. 1 the present invention provides a global DHT ring 0105 and one or more local DHT rings 0107. The global DHT ring 0105 includes all of storage nodes 0104 in the system 0101. On the other hand, the local DHT ring 0107 exists for each ISP 0102 and includes storage nodes 0104 connected to the ISP 0102. One storage node 0104 belongs to both the global DHT ring 0105 and one local DHT ring 0107. However it is not restricted by this invention that one storage node 0104 belongs to two or more local DHT rings 0107. In this description, we assume one storage node 0104 belongs to one global DHT ring 0107 because of simplicity of explanation.

Corresponding to the global DHT ring 0105 and the global DHT ring 0107, the storage node 0104 has memory which stores two kinds of management information including global management information 0106 and local management information 0108.

The global management information 0106 has an ISP node table 0109, a metadata table 0110, and a global routing table 0111. The ISP node table is used for managing the topology information among ISPs, the metadata table is used for managing locations of data stored in the storage nodes and the global routing table is used for managing the global DHT ring 0105, particularly routing.

The local management information has an object management table 0112, a Logical Unit (LU) management table 0113 and a local routing table 0114. A storage node 0104 can have multiple local routing tables. The storage node 0104 has a local storage 0115 and data objects 0116 are stored in the local storage. The object management table is used for managing the stored objects in the local storage. The Logical Unit (LU) management table is used for managing logical units which a storage node 0104 is using for storing data objects. The local routing table is used for managing the local DHT ring 0107, particularly routing.

FIG. 3 shows one example of implementations of storage nodes 0104. In this example, a storage node 0104 includes a storage node head 0301 and one or more LUs 0303 formed on a plurality of hard disk drives (not shown) in a networked storage 0302 and the storage node head and the networked storage are connected via a storage area network SAN 0304. The storage node head stores data objects in the LUs. One or more storage node heads can share same networked storage system. However one LU is assigned to one storage node head exclusively. In a case of a failure of a storage node head, an assignment of LUs are changed to alternative storage node heads if necessary. It is explained later how to assign LUs to storage node heads.

FIG. 4 shows another example of the implementations of storage nodes 0104. In this example, a storage node 0104 includes a storage node head 0301 and a networked storage 0302 having a plurality of hard disk drives upon which are formed the logical units (LUs) 0303. The storage node head 0301 and the networked storage 0302 are connected via a dedicated network cable. One storage node head uses an assigned networked storage exclusively and physically assembled as one hardware component. The storage node 0104 uses all of the LUs 0303 in the networked storage.

FIG. 5 shows one more another example of the implementations of storage nodes 0104. In this example, a storage node 0104 has a plurality of hard disk drives upon which are formed the LUs 0303.

A LU 0303 as shown in FIGS. 3, 4 and 5, formed on the hard disk drives, corresponds to a local storage 0115 shown in FIG. 1.

A LU can be a logical unit provided by a Small Computer System Interface (SCSI) interface of a storage system. A LU can also be a network share folder provided by a network file system protocol of a file server.

FIG. 6 shows an internal hardware configuration of a storage node head 0301. The storage node head includes a network interface card 0601, a processor 0602, a chipset 0603, a memory 0604 and a host bus adapter 0605. The chipset connects the other components. The network interface card connects the storage node head to a LAN via a network cable and used for communications with other systems. The host bus adapter connects the storage node head to a Storage Area Network (SAN) via a network cable and access to data in a networked storage. The processor is used for executing programs which realize the GDSS. The memory is used for storing tables required by the programs.

FIG. 7 shows an internal hardware configuration of a storage node 0104. The hardware configuration is same to the storage node head shown in FIG. 6 except for that the storage node 0104 has one or more hard disk drives 0701 and these are connected via a host bus adapter 0605. Data objects are stored in the hard disk drives.

FIG. 8 shows programs 0801 to 0814, 0816 running in a storage node 0104 or a storage node head 0301 and tables 0815, 0109, 0110, 0112 and 0113 used by the programs. Any storage nodes 0104 are homogeneous and have these programs and these tables. The programs are running on a processor of the storage node 0104 and the tables are stored in a memory of the storage node 0104.

The tables used in the DGSS are explained first and then the programs are explained after that.

From now, DHT rings are identified by an index. DHT [Global] is corresponding to the global DHT ring 0105 and DHT [Tokyo] is corresponding to the global DHT ring 0107 for an ISP named "Tokyo". In a case where a storage node 0104 belongs to multiple local DHT rings 0107, such local DHT rings 0107 are indexed by using an ISP name.

FIG. 9 shows a hierarchical routing table 0815. The hierarchical routing table has multiple routing table entries including the global routing table 0111 and the local routing table 0114. In a case where a storage node 0104 belongs to multiple local DHT rings 0107, a local routing table entry exists for each global DHT ring 0107.

The hierarchical routing table has 4 columns, DHT ring 0901, ISP Name 0902, IP address of next node 0903 and IP address of previous node 0904. DHT ring represents a name of DHT ring and ISP name represents a name of an ISP for which a DHT ring is constructed.

FIG. 10 shows an example of a global DHT ring 0105. The global DHT ring 0105 includes multiple storage nodes 0104 and constructs a ring topology among the storage nodes 0104. A storage node 0104 is connected to a next node and a previous node. For example, the next node of the storage node #10 is the storage node #20 and the previous node is #090 where #010, #020 and #090 are storage node IDs calculated by hashing IP addresses of these storage nodes 0104. The ring is configured in the order of the storage node IDs. The hierarchical routing table manages information about the next node and the previous node of the node.

FIG. 11 shows an example of a relationship between an IP address 1101, a hash value calculated from the IP address 1102 and a storage node ID 1103. In this example, any IP addresses are mapped to a hash space starting from 0 and ending to 100. An IP address, 192.168.2.20, is mapped to a hash value, 20, and has a storage node #020. Any storage node 0104 can calculate a hash value by itself. There is no centralized management server which calculates a hash value. In a real implementation, SHA1 or similar hashing algorithm is used for calculating a hash value from an IP address. Because a bit length of a hash value is 128 bit or longer, there is very few possibility of collegian. In this disclosure, we ignore such collegian in order to simplify the explanation.

FIG. 12 shows an example of a managed hash space 1201 in DHT ring [Global]. Each storage node 0104 is responsible for managing a part of the hash space and such managed hash spaces are exclusive each other. For example, the managed hash space by the storage node #020 starts from 10 but not including 10 and ends by 20, i.e., 10, 20]. Data objects have their own hash values, too. For example, in a case where a data object has a hash value #12, this data object is stored in a storage node #20 because #12 is included in a hash space 10, 20]. If a maximum hash value of a storage node 0104 in the system is 90 as shown in FIG. 12, the storage node #010 manages a hash space 90, 100]+[0, 10].

FIG. 13 shows an example of a managed hash space in global DHT ring 0107 [Tokyo1]. Tokyo1 is an ISP name. There are only two nodes in this ISP. The storage node #010 shown in this Figure is same as the storage node #10 shown in FIG. 11. Any storage node 0104 has only one hash value because it has one IP address and a hash value is calculated from the IP address. So the next node of the storage node #10 is the storage node #050 in this global DHT ring 0107. At the same time the storage node #010 has a next node in the global DHT ring 0105, i.e. the storage node #020 as shown in FIG. 12. A next node of a storage node 0104 may be different depending on a DHT ring. The hierarchical routing table 0815 manages the next nodes and the previous nodes for DHT rings to which a storage node 0104 belongs.

FIG. 14 shows an example of a managed hash space in global DHT ring 0107 [Tokyo1]. Because there is a fewer number of storage nodes 0104 in this global DHT ring 0107 compared with the global DHT ring 0105, a managed hash space of a storage node 0104 is wider than that in the global DHT ring 0105. For example, a managed hash space of a storage node #010 in this global DHT ring 0107 is [50, 100]+[0, 10] which is wider than [90, 100]+[0, 10] in FIG. 12.

FIG. 15 shows an ISP node table 0109 managed in the global DHT ring 0105. The ISP node table has a column, ISP Name 1501, Nodes in This ISP 1502 and Parent ISP Name 1503. ISP Name 1501 indicates that this ISP node table is for an ISP which name is ISP Name. Nodes in This ISP 1502 show a set of storage nodes 0104 that connect to this ISP. Parent ISP Name 1503 shows a name of an ISP to which this ISP is directly connected. By using a hash value calculated from an ISP name, an ISP node table has its own hash value. The storage node 0104 which managed hash table includes a hash value of an ISP node table stores the ISP node table.

FIG. 16 shows an example of a hierarchical topology 1601 among ISPs. The Internet includes many ISPs which are partially connected together. Any ISP has its parent ISP except for ISPs at the first tier. For example, an ISP Tokyo1 0102 has a parent ISP Tokyo. An ISP Japan belongs to the first tier so this ISP does not have any parent ISP but connects to the other ISPs at the first tier, an ISP EU in this example. A storage node 0104 is connected to an ISP 1020.

It should be noted that this disclosure considers only a parent ISP as a network relationship for simplicity but the network relationship is not restricted to only a parent relationship but also can be one or more parent relationships or one or more child relationships or one or more peer relationships. The global DHT ring 0105 constructs a topology by using these kinds of partial network relationships. This invention can support but not limited to hierarchical topology and mesh topology.

FIG. 17 shows a metadata table 0110 managed in the global DHT ring 0105. The metadata table has a column, File Name 1701, Hashed ID 1702, # of Replications 1703 and ISP Name 1704. File Name 1701 shows a name of a file which a storage node 0104 manages. Hashed ID 1702 shows a hash value of a file. A hash value of a file is calculated from its file name. Because a file name in the GDSS is unique, any file has a unique hashed ID. A storage node 0104 in a global DHT ring 0105 has its managed hash space. A metadata about a file is managed by a storage node 0104 which managed hash space includes a hashed ID of the file. For example, a storage node #050 has a managed hash space 20, 50] as shown in FIG. 12 and this storage node 0104 stores files which hashed ID are 35, 49, 22,12 and 28. # of Replications 1703 indicates the number of replications that have been created for a file. For example, in a case where # of Replications is 3, the GDSS has 3 copies of a file in the system and 3 copies include the original file. ISP Name 1704 indicates a name of an ISP within which a file is stored. For example, in a case where ISP Name is Tokyo1, a file named FILE001 is stored in one of the storage nodes 0104 that are connected to an ISP Tokyo1. The metadata table does not indicate in which storage node 0104 a file is stored but only an ISP name is indicated.

FIG. 18 shows an object management table 0112 managed in a global DHT ring 0107. The object management table has a column, Hashed ID 1801, Path Name 1802, Permission 1803, ACL 1804, # of Replication 1805 and Modified Time 1806. A storage node 0104 in a global DHT ring 0107 has its managed hash space. A data object is stored in a storage node 0104 which managed hash space includes a hashed ID of the data object. For example, a storage node #050 has a managed hash space 10, 50] shown in FIG. 14 and this storage node 0104 stores data objects which hashed IDs are 35, 12 and 28. Hashed ID 1801 shows a hashed ID of a data object. A file and a data object are linked by using a hashed ID. For example, a file FILE001 in FIG. 17 has a hashed ID 35 and the file is managed as a data object which hashed ID is 35 in FIG. 18. Path Name 1802 is a name of a path used to access a data object in a local storage 0115 of a storage node 0104. In a case where a storage node 0104 stores data objects as a file in its local file system, a file name in the local file system is given to a data object. For example, a data object 35 is stored as a file at a path of /dir1/dir2/fileA in a local file system of a storage node #050. Permission 1803 indicates what kinds of accesses are allowed to a data object. ReadWrite means a user can read and write a data object. ReadOnly means a user can only read a data object but can not write the data object. AppendOnly means a user can only append data to a data object. These are just examples and there can be more different types of permissions can be considered. Access Control List (ACL) 1804 indicates which users can access to a data object. In this example, User1 and User2 can access to a data object 35. # of Replication 1805 is same information managed in a metadata table 0110 at the global DHT ring 0105. A storage node 0104 which stores a data object copies the data object to the other storage nodes 0104 within the same global DHT ring 0107 by following the ring topology. Modified Time 1806 indicates when an data object was modified last time. An object management table can have more different types of time information about a data object such like created time, read time, and so on.

FIG. 19 shows a LU management table managed by a storage node 0104. The LU management table has a column, Network Storage Name 1901, Resource ID 1902, Hashed LUN 1903 and Mount Point 1904. The LU management table is used when a storage node 0104 is configured as shown in FIG. 3 or FIG. 4 where a storage node head 0301 and a networked storage 0302 are separated. Network Storage Name 1902 indicates a list of networked storages 0302 within which logical units are stored and to which a storage node head 0301 is connected. Resource ID 1902 indicates which logical unit(s) 0303 within a networked storage is used by a storage node head. Resource ID is a unique identifier of a logical unit within a networked storage. A logical unit can be a logical disk volume provided by a Redundant Array of Independent Disks (RAID) disk array or a shared folder provided by a file server. Hashed LUN indicates a hash value of a logical unit and is calculated by hashing a combination of a Network Storage Name and a Resource ID. In a case where a networked storage is shared by multiple storage node heads, which logical units are managed by which storage node heads is determined by Resource ID of a logical unit and a managed hash space of a storage node 0104. For example, a storage node #050 has a managed hash space [10, 50] and uses logical units which Resource IDs are 13, 33 and 49. Mount Point 1904 indicates which directory a logical unit is mounted on so a data object is stored by specifying a directory and finally stored in a logical unit mounting on the directory.

FIG. 40 shows a flow chart of DHT Kernel 0814. DHT Kernel is a process running on a storage node 0104 and receives a request from the other storage nodes 0104 and the internal functions. DHT Kernel also executes some functions periodically without receiving any request. In step 4001, DHT Kernel checks if there is any request received. If yes, DHT kernel calls a function corresponding to the request. In step 4003, DHT kernel checks if specified time has passed from the last time DHT Kernel executed periodic functions. If yes, DHT Kernel calls Periodic Calls function 4101. In step 4005, DHT Kernel sleeps for a while, several milliseconds. DHT Kernel is interrupted and starts step 4001 when a new request was received 4006.

FIG. 20 and FIG. 21 show a Create New System 0801 function of a storage node 0104. This function is called only when a new system is created firstly and there is only one storage node 0104 in the system.

FIG. 20 shows parameters 2001 required to call this function. In the input, IP Address of New Node 2002, This ISP Name 2003 and Parent ISP Name 2004 are specified. IP Address of New Node 2002 is an IP address which is assigned to a new storage node 0104 and must be unique in the DGSS. This ISP Name 2003 is a name of an ISP to which a new storage node 0104 is connected. Parent ISP Name 2004 is a name of a parent ISP of this ISP.

FIG. 21 shows a flow chart of Create New System 0801 function. In the step 2101, the storage node 0104 initializes its hierarchical routing table 0815 by setting DHT[Global].nextnode=IP Address of New Node, DHT[Global].prevnode=NULL, DHT[This ISP Name].nextnode=IP Address of New Node and DHT[This ISP Name].prevnode =NULL. In the step 2102, the storage node 0104 calls Update_ISPNodeTable sub function 2301 with parameter settings as Requested ISP Name 2202=This ISP Name 2003, IP Address of New Node 2203=IP Address of New Node 2002, and Parent ISP Name 2204=Parent ISP Name 2004. After this step, this function is completed.

FIG. 22 and FIG. 23 show an Update_ISPNodeTable sub function 2301.

FIG. 22 shows parameters 2201 required to call this sub function. In the input, Requested ISP Name 2202, IP Address of New Node 2203 and Parent ISP Name 2204 are specified. Update_ISPNodeTable adds a new storage node 0104 specified by IP Address of New Node to an ISP node table corresponding to an ISP specified by Requested ISP Name. In a case where there is no ISP node table for the ISP, a new ISP node table is created. Requested ISP Name 2202 indicates a name of an ISP which corresponding ISP node table is modified. IP Address of New Node 2203 is an IP address of a new storage node 0104 which is being connected to the ISP. Parent ISP Name 2204 is a name of a parent ISP of this ISP.

FIG. 23 shows a flow chart of Update_ISPNodeTable sub function 2301. In step 2302, a storage node 0104 calculates a hash value from Requested ISP Name. In step 2303, the storage node 0104 calls Get_Node sub functions 2501 with parameter setting as Requested Hash Value 2402=the hash value calculated in step 2302 and Requested ISP Name 2403="Global" in order to find a storage node 0104 which manages an ISP node table for an ISP specified by Requested ISP Name. Because an ISP node table is managed within a global DHT ring 0105, "Global" is specified as an input to Get_Node sub function. In step 2304, the storage node 0104 calls Add_To_ISPNodeTable sub function 2701 with parameter settings as Requested ISP Name 2602=Requested ISP Name 2202, IP Address of New Node 2603=IP Address of New Node 2203 and Parent ISP Name 2604=Parent ISP Name 2204 to the node which was acquired in step 2303. After this step, this function is completed.

FIG. 24 and FIG. 25 show a Get_Node sub function 2501.

FIG. 24 shows parameters 2401 required to call this sub function. In the input, Requested Hash Value 2402 and Requested ISP Name 2403 are specified. Get_Node finds a storage node 0104 which is connected to a DHT ring specified by Requested ISP Name and has a managed hash space which includes a hash value indicated by Requested Hash Value 2402.

FIG. 25 shows a flow chart of Get_Node sub function 2501. In step 2502, the storage node 0104 sets a next node within DHT ring [Requested ISP Name] in a hierarchical routing table into CurrentNode. From step 2503 to step 2505, the storage node 0104 looks for a storage node 0104 which manages a hash value specified by Requested Hash Value within the requested DHT ring by following a ring topology. In step 2503, the storage node 0104 calculates a hash value from an IP address of CurrentNode and stores the result as ManagedHashValue. ManagedHashValue is a maximum hash value of a managed hash space of the CurrentNode. In step 2504, the storage node 0104 checks if Requested Hash Value is managed by the CurrentNode by comparing Requested Hash Value is less than or equal to ManagedHashValue. If no, in step 2505, the storage node 0104 calls Get_NextNode sub function 3101 with parameter settings as Requested ISP Name 3002 =Requested ISP Name 2403 and store the result as a new CurrentNode. The storage node 0104 can get a next node of a CurrentNode in DHT ring [Requested ISP Name] by this sub function. And then repeat from step 2503. If yes in step 2504, the storage node 0104 returns CurrentNode as the result of this sub function.

FIG. 26 and FIG. 27 explain an Add_To_ISPNodeTable sub function 2701.

FIG. 26 shows parameters 2601 required to call this sub function. In the input, Requested ISP Name 2602, IP Address of New Node 2603 and Parent ISP Name 2604 are specified. A storage node 0104 which received this request executes Add_To_ISPNodeTable sub function and adds a new storage node 0104 specified by IP Address of New Node 2603 to an ISP node table specified by Requested ISP Name 2602 if the ISP node table exists already. If no ISP node table exists for the ISP specified by Requested ISP Name then the storage node 0104 creates a new ISP node table for the ISP.

FIG. 27 shows a flow chart of Add_To_ISPNodeTable sub function 2701. In step 2702, a storage node 0104 checks if there is an existing ISP node table for the ISP specified by Requested ISP Name 2602. If not, in step 2703, the storage node 0104 creates a new ISP node table with settings as ISP Name 1501=Requested ISP Name 2602, Nodes in This ISP 1502={IP Address of New Node 2603} and Parent ISP Name 1503=Parent ISP Name 2604. If yes in step 2702, in step 2704, the storage node 0104 adds IP Address of New Node 2603 to Nodes in This ISP 1502 of the ISP Node Table.

FIG. 28 and FIG. 29 show a Join to System function 0802.

FIG. 28 shows parameters 2801 required to call this function. In the input, IP Address of New Node 2802, This ISP Name 2803, Parent ISP Name 2804 and Existing Node 2805 are specified. A new storage node 0104 specified by IP Address of New Node 2802 executes Join to System function and adds itself to the existing GDSS. The new storage node 0104 is connected to the ISP specified by This ISP Name 2803 and the parent ISP name of this ISP is indicated by Parent ISP Name 2804. The new storage node 0104 communicates to an existing storage node 0104 specified by Existing Node 2805 in the GDSS in order to execute this function.

FIG. 29 shows a flow chart of a Join to System function 0802. In step 2901, the new storage node 0104 calls Join to DHT Ring function 0803 with parameter settings as Requested ISP Name 3602="Global", IP Address of New Node 3603=IP Address of New Node 2803, and IP Address of Existing Node 3604=Existing Node 2805. In step 2902, the new storage node 0104 calls Update_ISPNodeTable sub function with parameter settings as Requested ISP Name 2202=This ISP Name 2803, IP Address of New Node 2203=IP Address of New Node 2802 and Parent ISP Name 2204=Parent ISP Name 2804. In step 2903, the new storage node 0104 calculates a hash value from This ISP Name 2803. In step 2904, the new storage node 0104 calls $Get_{13}$ Node sub function with parameter settings as Requested Hash Value 2402=the hash value calculated in step 2903 and Requested ISP Name 2403="Global". In step 2905, the new storage nodes 0104 calls Get_ISPNodeTable sub function 3501 with parameter settings as Requested ISP Name 3402=This ISP Name 2803 to the storage node 0104 acquired in step 2904. In step 2906, the new storage node 0104 checks if the new storage node 0104 itself is only one node connected to this ISP. If yes, there is no global DHT ring 0107 for the ISP so the new storage node 0104 creates a new global DHT ring 0107 for the ISP. The new storage node 0104 sets DHT[This ISP Node].nextnode=IP Address of New Node and DHT[This ISP Node].prevnode=NULL. If no in step 2906, the new storage node 0104 chooses any storage node 0104 in the ISP node table acquired in step 2905 and calls Join to DHT Ring function 0803 with parameter settings as Requested ISP Name 3602=This ISP Name 2803, IP Address of New Node 3603=IP Address of New Node 2802, and IP Address of Existing Node 3604=a storage node 0104 chosen in step 2908. There is a case in which a storage node 0104 chosen in step 2908 is failed and can not be communicated. In such a case, the new storage node 0104 chooses another storage node 0104 in the ISP node table. If there is no storage node 0104 available, go to step 2907.

FIG. 30 and FIG. 31 show a Get_NextNode sub function 3101.

FIG. 30 shows parameters 3001 required to call this function. In the input, Requested ISP Name 3002 is specified. When a storage node 0104 received Get_NextNode requests, it returns a next node of the storage node 0104 in DHT ring specified by Requested ISP Name 3002.

FIG. 31 shows a flow chart of Get_NextNode sub function 3101. In step 3102, the storage node 0104 returns DHT[Requested ISP Name].nextnode to the requester.

FIG. 32 and FIG. 33 show a Get_PrevNode sub function 3301.

FIG. 32 shows parameters 3301 required to call this function. In the input, Requested ISP Name 3202 is specified. When a storage node 0104 received Get_PrevNode requests, it returns a previous node of the storage node 0104 in DHT ring specified by Requested ISP Name 3202.

FIG. 33 shows a flow chart of Get_PrevNode sub function 3301. In step 3302, the storage node 0104 returns DHT[Requested ISP Name].prevnode to the requester.

FIG. 34 and FIG. 35 show a Get_ISPNodeTable sub function 3301.

FIG. 34 shows parameters 3401 required to call this function. In the input, Requested ISP Name 3402 is specified. When a storage node 0104 received Get_ISPNodeTable requests, it returns an ISP node table specified by Requested ISP Name 3402.

FIG. 35 shows a flow chart of Get_ISPNodeTable sub function 3501. In step 3502, the storage node 0104 returns an ISP node table specified by Requested ISP Name 3402.

FIG. 36 and FIG. 37 show a Join to DHT Ring function 0803.

FIG. 36 shows parameters 3601 required to call this function. In the input, Requested ISP Name 3602, IP Address of New Node 3603 and IP Address of Existing Node 3604 are specified. The new storage node 0104 specified by IP Address of New Node 3603 adds itself into DHT ring specified by Requested ISP Name 3602 by communicating with an existing storage node 0104 specified by IP Address of Existing Node 3604. The existing storage node 0104 is a storage node 0104 which had already joined in the DHT ring.

FIG. 37 shows a flow chart of Join to DHT Ring function 0803. In step 3701, the new storage node 0104 sets DHT[Requested ISP Name].prevnode=NULL. In step 3702, the new storage node 0104 calls Find Successor sub function 0804 with parameter settings as Requested ISP Name 3802=Requested ISP Name 3602, IP Address of Requested Node 3803=IP Address of New Node 3603, and IP Address of Examined Node 3804=IP Address of Existing Node 3604 and stores the result in Successor. As the result of Find Successor sub function, the new storage node 0104 gets an immediate next node of itself in DHT ring specified by Requested ISP Name. In step 3703, the new storage node 0104 sets DHT[Requested ISP Name].nextnode=Successor.

FIG. 38 and FIG. 39 show a Find Successor function 0804.

FIG. 38 shows parameters 3801 required to call this function. In the input, Requested ISP Name 3802, IP Address of Requested Node 3803 and IP Address of Examined Node 3804 are specified. The storage node 0104 looks for an immediate next node of the storage node 0104 specified by IP Address of Requested Node 3803 in DHT ring specified in Requested ISP Name 3802. This function searches the next node by starting from the storage node 0104 specified by IP Address of Examined Node 3804.

FIG. 39 shows a flow chart of Find Successor function 0804. In step 3901, the storage node 0104 calculates a hash value from IP Address of Requested Node 3803 and stores it as RequestedHashValue. In step 3902, the storage node 0104 calculates a hash value from IP Address of Examined Node 3804 and stores it as ExaminedHashValue. In step 3903, the storage node 0104 requests Get_NextNode sub function to the storage node 0104 specified by IP Address of Examined Node 3804 and stores the result as NextNode. In step 3904, the storage node 0104 calculates a hash value from NextNode and stores it as NextHashValue. In step 3905, the storage node 0104 checks a condition, ExaminedHashValue<RequestedHashValue<=NextHashValue. If no, it means the requested storage node 0104 is not inserted between the examined storage node 0104 and the next node of the examined node. So in step 3906, IP Address of Examined Node is set to NextNode and go back to step 3902. If yes in step 3905, the storage node 0104 returns NextNode as the result of this function.

FIG. 41 shows a flow chart of Periodic Calls function 0813. This function is called by DHT Kernel 0814 periodically. This function executes Stabilization function 0805 and Check Predecessor function 0806 for each DHT ring in the hierarchical routing table 0815. In step 4101, the storage node 0104 sets ISP Name=DHT[First Entry].ISP Name. In step 4102, the storage node 0104 calls Stabilization function 0805 with parameter settings as Requested ISP Name 4202=ISP Name. And in step 4103, the storage node 0104 also calls Check Predecessor function 0806 with parameter settings as Requested ISP Name 4602=ISP Name. In step 4104, the storage node 0104 checks if all of the entries in the hierarchical routing table 0814 has completed. If not, in step 4105, the storage node 0104 sets ISP Name=DHT[]Next Entry].ISP Name and repeat from step 4102. If yes in step 4104, this function completes.

FIG. 42 and FIG. 43 show a Stabilization function 0805.

FIG. 42 shows parameters 4201 required to call this function. In the input, Requested ISP Name 4202 is specified. Stabilization function checks if DHT[Requested ISP Name].nextnode and DHT[Requested ISP Name].prevnode are correct or not and correct them if necessary.

FIG. 43 shows a flow chart of Stabilization function 0805. In step 4301, the storage node 0104 sets Next Node=DHT[Requested ISP Name 4202].nextnode. In step 4302, the storage node 0104 requests Get_PrevNode sub function 3301 to Next Node and stores the result as Previous Node. In step 4303, the storage node 0104 calculates a hash value from Previous Node and stores it as PrevHashValue. If Previous Node=Null, then PrevHashValue=0. In step 4304, the storage node 0104 calculates a hash value from IP address of this storage node 0104 and stores it as ThisHasValue. In step 4305, the storage node 0104 calculates a hash value from Next Node and stores it as NextHashValue. In step 4306, the storage node 0104 checks the condition, ThisHashValue<PrevHashValue<NextHashValue. If yes, DHT[Requested ISP Name] is not correct. So in step 4307, the storage node 0104 sets DHT[Requested ISP Name].nextnode=PrevNode and in step 4308, the storage node 0104 requests Notify function 0806 with parameter setting as Requested ISP Name 4402=Requested ISP Name 4202 and IP Address of Previous Node 4403=IP address of this node to Previous Node so Previous Node also corrects its routing table. If no in step 4306, the storage node 0104 requests Notify function 0806 with parameter settings as Requested ISP Name 4402=Requested ISP Name 4202 and IP Address of Previous Node 4403=IP address of this node to Next Node so Next Node may correct a previous node of its routing table.

FIG. 44 and FIG. 45 show a Notify function 0806.

FIG. 44 shows parameters 4401 required to call this function. In the input, Requested ISP Name 4402 and IP Address of New Previous Node 4403 are specified. Notify function checks if DHT[Requested ISP Name 4402].prevnode is correct. If not, the prevnode is set to IP Address of New Previous Node 4403.

FIG. 45 shows a flow chart of Notify function 0806. In step 4501, if DHT[Requested ISP Name 4402].prevnode=Null, then in step 4506, the prevnode is set to IP Address of New Previous Node 4403. If not in step 4501, then in step 4502, the storage node 0104 calculates a hash value from DHT[Requested ISP Name 4402].prevnode and stores it as PrevHashValue. In step 4503, the storage node 0104 calculates a hash value from IP address of this node and stores it as This HashValue. In step 4504, the storage node 0104 calculates a hash value from IP Address of New Previous Node 4403 and stores it as NewPrevHashValue. In step 4504, the storage node 0104 checks the condition, PrevHashValue<NewPrevHashValue<ThisHashValue. If the condition is met, then in step 4506, DHT[Requested ISP Name 4402].prevnode is set to IP Address of New Previous Node. If not in step 4505, the storage node 0104 does not change the previous node.

FIG. 46 and FIG. 47 show a Check Predecessor function 0807.

FIG. 46 shows parameters 4601 required to call this function. In the input, Requested ISP Name 4602 is specified. Check Predecessor function 0807 checks if a previous node of this storage node 0104 in DHT ring [Requested ISP Name 4602] is working or failed and corrects the routing table.

FIG. 47 shows a flow chart of Check Predecessor function 0807. In step 4701, the storage node 0104 sets Prev Node=DHT[Requested ISP Name 4602].prevnode. In step 4702, the storage node 0104 checks if Prev Node is working or failed. Typically ping is used for checking. In step 4703, if Prev Node is working, this function exists. If not, in step 4704, the storage node 0104 sets DHT[Requested ISP Name 4602].prevnode=Null.

FIG. 48 shows a Get Topology function 0811. A user of a client 0117 requests one of the storage nodes 0104 in the GDSS and gets a topology of the GDSS by calling Get Topology function and then decides which ISP a user wants to store files. Get Topology function does not require any parameter to input. In step 4801, the storage node 0104 sets Next Node=DHT[Global].nextnode. In step 4802, the storage node 0104 calls Get_ISPNodeTable sub function 3501 to Next Node and stores the result in a temporal memory. In step 4803, the storage node 0104 calls Get_NextNode sub function 3101 to Next Node and stores the result in Next Node. In step 4804, the storage node 0104 checks if Next Node is this storage node 0104. If no, the storage node 0104 repeats from step 4802. If yes in step 4804, the storage node 0104 could have got all of ISP node tables from the global DHT ring 0105. In step 4805, the storage node 0104 creates a hierarchical tree of relationships between ISPs by referring to ISP Name 1501 and Parent ISP Name 1503 of all of the ISP node tables. The storage node 0104 returns the result to the requester.

It should be noted that if there are tens of thousands storage nodes 0104 in the GDSS, it takes very long time to get all of the ISP node tables by accessing all of the storage nodes 0104 around the world. In order to reduce this time, a copy of an ISP node table is sent from a storage node 0104 to a centralized server when the ISP node table was created or modified. The centralized server is working outside of the GDSS so the GDSS works without the centralized server but the centralized server serves for clients 0117 to create and provide a topology of the GDSS. Because all of the ISP node tables are stored in the centralized server, a client can get the topology faster.

FIG. 49 and FIG. 50 show a Change Topology function 0812.

FIG. 49 shows parameters 4901 required to call this function. In the input, Requested ISP Name 4902 and New Parent ISP Name 4903 are specified. A storage node 0104 which received this request asks the storage node 0104 which has an ISP node table specified by Requested ISP Name 4902 to change Parent ISP Name 1503 of the ISP node table to New Parent ISP Name 4903. As this result, a topology of DGSS is changed.

FIG. 50 shows a flow chart of Change Topology function 0812. In step 5001, the storage node 0104 calculates a hash value from Requested ISP Name 4902. In step 5002, the storage node 0104 calls $Get_{13}$ Node function 2501 with parameter settings as Requested Hash Value 2402=the hash value calculated in step 5001 and Requested ISP Name 2403="Global". The storage node 0104 calls Change_ISPNodeTable sub function 5201 with parameter settings as Requested ISP Name 5102=Requested ISP Name 4902 and New Parent ISP Name 5103=New Parent ISP Name 4903 to the storage node 0104 acquired in step 5002.

FIG. 53 and FIG. 54 show a Put File function 0808. A client calls this function to store a file in the GDSS.

FIG. 53 shows parameters 5301 required to call this function. In the input, Request Type 5302, Requested ISP Name 5303, File Name 5304, Permission 5305, ACL 5306, # of Replications 5307 and File Data 5308 are specified. As the result of Put File function, a file where its file name is File Name 5304 and its content is File Data 5308 is stored within DHT ring [Requested ISP Name 5303]. A metadata table 0110 for the file is also created or updated by Permission 5305, ACL 5306 and # of Replications 5307 information.

FIG. 54 shows a flow chart of Put File function 0808. In step 5401, the storage node 0104 which received the request calculates a hash value from File Name 5304. In step 5402, the storage node 0104 calls $Get_{13}$ Node function 2501 with parameter settings as Requested Hash Value 2402=the hash value calculated in step 5401 and Requested ISP Name 2403="Global". In step 5403, the storage node 0104 calls Update_Metadata sub function 5601 with parameter settings as Requested ISP Name 5502=Requested ISP Name 5303, File Name 5503=File Name 5304, Permission 5504=Permission 5305, ACL 5505=ACL 5306 and # of Replications 5506=# of Replications 5307 to the storage node 0104 acquired in step 5402. In step 5404, the storage node 0104 calculates a hash value from Requested ISP Name 5303. In step 5405, the storage node 0104 calls $Get_{13}$ Node function 2501 with parameter setting as Requested Hash Value 2402=the hash value calculated in step 5404 and Requested ISP Name 2403="Global". In step 5406, the storage node 0104 calls Get_ISPNodeTable sub function with parameter settings as Requested ISP Name 3402=the ISP name acquired in step 5403 to the storage node 0104 acquired in step 5405. In step 5407, the storage node 0104 calls Put Object sub function 5801 with parameter settings as Request Type 5702="Put Object", Hash Value 5703=the hash value calculated in step 5401, Requested ISP Name 5704=Requested ISP Name 5303, Permission 5705=Permission 5305, ACL 5706=ACL 5306, # of Replications 5707=# of Replications 5307 and Object Data 5708=File Data 5308 to one of the storage nodes 0104 in the ISP node table acquired in step 5406. In a case of the chosen storage node 0104 in step 5407 is being failed or can not be accessed, the storage node 0104 tries another storage node 0104 in the ISP node table.

FIG. 55 and FIG. 56 show an Update_Metadata sub function 5601.

FIG. 55 shows parameters 5501 required to call this function. In the input, Requested ISP Name 5502, File Name 5503, and # of Replications 5504 are specified. Update-_Metadata sub function creates or modifies an entry specified by File Name 5503 in an ISP node table specified by Requested ISP Name 5502 with information provided as the parameters 5504.

FIG. 56 shows a flow chart of Update_Metadata sub function 5601. In step 5602, the storage node 0104 calculates a hash value from File Name 5503. In step 5603, the storage node 0104 creates if not exsists or modifies if exists an entry 1701, 1702, 1703 and 1704 specified by the hash value calculated in step 5602 in the ISP node table specified by Requested ISP Name 5502 with information provided as the parameters 5506.

FIG. 57, FIG. 58 and FIG. 59 show a Put Object sub function 5801.

FIG. 57 shows parameters 5701 required to call this function. In the input, Request Type 5702, Hash Value 5703, Requested ISP Name 5704, Permission 5705, ACL 5706, # of Replications 5707 and Object Data 5708 are specified. As the result of Put Object function, an object where its hash value is Hash Value 5703 and its content is Object Data 5708 is stored within DHT ring [Requested ISP Name 5704]. An object management table 0112 is also created or updated by provided information Permission 5705, ACL 5706 and # of Replications 5707.

FIG. 58 shows a flow chart of Put Object sub function 5801. In step 5802, the storage node 0104 calls $Get_{13}$ Node function 2501 with parameter settings as Requested Hash Value 2402=Hash Value 5703 and Requested ISP Name 2403=Requested ISP Name 5704. In step 5803, the storage node 0104 calls Write_Object sub function 5901 with same parameter settings as this function to the storage node 0104 acquired in step 5802.

FIG. 59 shows a flow chart of Write_Object sub function 5901. In step 5902, the storage node 0104 stores the received object data 5708 in its local storage 0115 and creates or updates the entry 1801 to 1806 specified by Hash Value 5703 in the object management table 0112 with provided information 5702 to 5707.

FIG. 60 and FIG. 61 show a Get File function 0809. A client calls this function to any of the storage nodes 0104 in the GDSS to read a file.

FIG. 60 shows parameters 6001 required to call this function. In the input, Request Type 6002 and File Name 6003 are specified. As the result of this function, a file specified by File Name 6003 is sent to a client.

FIG. 61 shows a flow chart of Get File function 0809. In step 6101, the storage node 0104 which received the request calculates a hash value from File Name 6003. In step 6102, the storage node 0104 calls $Get_{13}$ Node function 2501 with parameter settings as Requested Hash Value 2402=the hash value calculated in step 6101 and Requested ISP Name 2403="Global". In step 6103, the storage node 0104 calls Get_ISPName sub function 6301 with parameter settings as File Name 6202=File Name 6003 to the storage node 0104 acquired in step 6102. In step 6104, the storage node 0104 calculates a hash value from the ISP name acquired in step 6103. In step 6105, the storage node 0104 calls $Get_{13}$ Node function 2501 with parameter setting as Requested Hash Value 2402=the hash value calculated in step 6104 and Requested ISP Name 2403="Global". In step 6106, the storage node 0104 calls Get_ISPNodeTable sub function with parameter settings as Requested ISP Name 3402=the ISP name acquired in step 6103 to the storage node 0104 acquired in step 6105. In step 6107, the storage node 0104 calls Get Object sub function 6501 with parameter settings as Request Type 6402="Get Object", Hash Value 6403=the hash value calculated in step 6101, Requested ISP Name 6404=the ISP name acquired in step 6103 to one of the storage nodes 0104 in the ISP node table acquired in step 6106. In a case of the chosen storage node 0104 in step 6107 is being failed or can not be accessed, the storage node 0104 tries another storage node 0104 in the ISP node table.

FIG. 62 and FIG. 63 show a Get_ISPName sub function 6301.

FIG. 62 shows parameters 6201 required to call this sub function. In the input, File Name 6202 is specified. This sub function returns a name of an ISP within which a file specified by File Name 6202 is stored.

FIG. 63 shows a flow chart of Get_ISPName sub function 6301. In step 6302, the storage node 0104 calculates a hash value from File Name 6202. In step 6203, the storage node 0104 returns ISP Name 1704 in the entry specified by the hash value calculated in step 6302 in the metadata table 0110.

FIG. 64, FIG. 65 and FIG. 66 show a Get Object sub function 6501.

FIG. 64 shows parameters 6401 required to call this sub function. In the input, Request Type 6402, Hash Value 6403 and Requested ISP Name 6404 are specified. This sub function sends an object data specified by Hash Value 6403 from DHT ring [Requested ISP Name 6404] to the requester.

FIG. 65 shows a flow chart of Get Object sub function 6501. In step 6502, the storage node 0104 calls $Get_{13}$ Node function 2501 with parameter settings as Requested Hash Value 2402=Hash Value 6403 and Requested ISP Name 2403=Requested ISP Name 6404. In step 6503, the storage node 0104 calls Read_Object sub function 6601 with same parameter settings as this function to the storage node 0104 acquired in step 6502. In step 6503, the storage node 0104 sends the read object data to the requester. FIG. 66 shows a flow chart of Read_Object sub function 6601. In step 6602, the storage node 0104 reads the requested object from a local storage 0115 and sends it to the requester.

FIG. 67 and FIG. 68 show a Delete File function 0816. A client calls this function to any of the storage nodes 0104 in the GDSS to delete a file.

FIG. 67 shows parameters 6701 required to call this function. In the input, Request Type 6702 and File Name 6703 are specified. This function deletes the file specified by File Name 6703 from the DGSS.

FIG. 68 shows a flow chart of Delete File function 0816. In step 6801, the storage node 0104 which received the request calculates a hash value from File Name 6703. In step 6802, the storage node 0104 calls $Get_{13}$ Node function 2501 with parameter settings as Requested Hash Value 2402=the hash value calculated in step 6801 and Requested ISP Name 2403="Global". In step 6803, the storage node 0104 calls Get_ISPName sub function 6301 with parameter settings as File Name 6202=File Name 6703 to the storage node 0104 acquired in step 6802. In step 6804, the storage node 0104 calculates a hash value from the ISP name acquired in step 6803. In step 6805, the storage node 0104 calls $Get_{13}$ Node function 2501 with parameter setting as Requested Hash Value 2402=the hash value calculated in step 6804 and Requested ISP Name 2403="Global". In step 6806, the storage node 0104 calls Get_ISPNodeTable sub function with parameter settings as Requested ISP Name 3402=the ISP name acquired in step 6803 to the storage node 0104 acquired in step 6805. In step 6807, the storage node 0104 calls Delete_Object sub function 7201 with parameter settings as Request Type 7102="Delete Object", Hash Value 7103=the hash value calculated in step 6801, Requested ISP Name 7104=the ISP name acquired in step 6803 to one of the storage nodes 0104 in the ISP node table acquired in step 6806. In a case of the chosen storage node 0104 in step 6107 is being failed or can not be accessed, the storage node 0104 tries another storage node 0104 in the ISP node table. In step 6808, the storage node 0104 calls Delete_Metadata sub function 7001 with parameter settings as File Name 6902=File Name 6703 to the storage node 0104 acquired in step 6802.

FIG. 69 and FIG. 70 show a Delete_Metadata sub function 7001.

FIG. 69 shows parameters 6901 required to call this function. In the input, File Name 6902 is specified. The storage node 0104 which received this request removes an entry specified by File Name 6902 from the metadata table which the storage node 0104 manages.

FIG. 70 shows a flow chart of Delete_Metadata sub function 7001. In step 7002, the storage node 0104 calculates a hash value from File Name 6902. In step 7003, the storage node 0104 removes the entry specified by the hash value calculated in step 7002 from the metadata table which the storage node 0104 manages.

FIG. 71, FIG. 72 and FIG. 73 show a Delete_Object sub function 7201.

FIG. 71 shows parameters 7101 required to call this function. In the input, Request Type 7102, Hash Value 7103 and Requested ISP Name 7104 are specified. This function deletes an object data specified by Hash Value 7103 from DHT ring [Requested ISP Name 7104].

FIG. 72 shows a flow chart of a Delete_Object sub function 7201. In step 7202, the storage node 0104 calls $Get_{13}$ Node function 2501 with parameter settings as Requested Hash Value 2402=Hash Value 7103 and Requested ISP Name 2403=Requested ISP Name 7104. The storage node 0104 calls Remove_Object sub function 7301 with same parameter settings as this function to the storage node 0104 acquired in step 7202.

FIG. 73 shows a flow chart of a Remove_Object sub function 7301. In step 7302, the storage node 0104 deletes an object data specified by Hash Value 7103 from its local storage 0115 and also removes the entry specified by Hash Value 7103 from the object management table 0112.

FIG. 73 and FIG. 74 show a Move File function 0810. A client calls this function to any of the storage nodes 0104 in the GDSS to move a file from one ISP to another ISP.

FIG. 73 shows parameters 7301 required to call this function. In the input, Request Type 7302, File Name 7303 and New ISP Name 7304 are specified. This function moves a file specified by File Name 7303 to an ISP specified by New ISP Name 7304.

FIG. 74 shows a flow chart of a Move File function 0810. In step 7402, the storage node 0104 calls Get File function 0809 with parameter settings as Request Type 6002="Get File" and File Name 6003=File Name 7303. In step 7403, the storage node 0104 calls Delete File function 0816 with parameter setting as Request Type 6702="Delete File" and File Name 6703 =File Name 7303. In step 7404, the storage node 0104 calls Put File function 0808 with parameter settings as Request Type 5302="Put File", Requested ISP Name 5303=New ISP Name 7304, File Name 5304=File Name 7303 and File Data 5308=a file read in step 7402. Other parameters such as Permission 5305, ACL 5306 and # of Replications 5307 are also set to be same as the file deleted in step 7403.

In a case of a storage node 0104 failure, the storage node 0104 which has an ISP node table for the failed storage node 0104 updates the ISP node table to remove the failed storage node 0104. In order to detect failures of storage nodes 0104, the storage node 0104 checks if the storage nodes 0104 in the ISP node table is alive periodically. In a case of detecting a node failure, the failed node is removed from the ISP node table.

The present invention can be used as a basic architecture for a cloud storage which is a component of a cloud computing. In the cloud computing, there are a large number of distributed computing nodes at multiple data centers and the cloud storage is used for storing data for the computing nodes. A local DHT ring in this invention can be located at each data center and stores the data for the computing nodes in the data center. It is also possible when applications running on the computing nodes at one location were moved to different location the data stored in the local DHT ring is also moved to another local DHT ring in the second location. It is also possible to store copies of the original data to different local DHT rings and clients can access to data stored in the closest local DHT ring in order to get faster response time.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A geographically distributed storage system comprising: a plurality of logical storage systems,
wherein one of said logical storage systems is a global peer-to-peer ring,
wherein at least one of the other logical storage systems is a local peer-to-peer ring,
wherein said global peer-to-peer ring includes all storage nodes in the geographically distributed storage system connected to each other via a first network, and said local peer-to-peer ring includes storage nodes connected to each other via a second network which forms a part of the first network,
wherein each storage node connected to the second network belongs to both said global peer-to-peer ring and said local peer-to-peer ring,
wherein each storage node includes global management information concerning said global peer-to-peer ring and local management information concerning said local peer-to-peer ring,
wherein the global management information includes a second network node table which is used for managing topology information of second networks forming a part of the first network, a metadata table which is used for managing locations of data stored in the storage nodes of the geographically distributed storage system, and a global routing table which is used for managing routing in the global peer-to-peer ring,
wherein the local management information includes an object management table which is used for managing data objects stored in the storage nodes connected to the second network, a Logical Unit Management Table which is used for managing logical units in the storage nodes connected to the second network that store the data objects, and a local routing table which is used for managing routing in the local peer-to-peer ring,
wherein in the global peer-to-peer ring:
a hash value of a file which is managed by a storage node in is calculated using a file name which indicates a name of the file which is managed by the storage node,
the storage node managing the file is determined using the calculated hash value of the file which is managed by the storage node,
the storage node is requested to obtain an Internet Service Provider name corresponding to the file name from the meta data table,
a hash value of the Internet Service Provider name is calculated,
the storage node which manages an Internet Service Provider node table of the Internet Service Provider is determined using the calculated hash value of the Internet Service Provider, and
the storage node uses the Internet Service Provider name to find nodes that constitute the Internet Service Provider using the Internet Service Provider table, and
wherein in the local peer-to-peer ring:
a storage node of the local peer-to-peer ring managing the object management table is determined using the calculated hash value of the file which is managed by the storage node, and
a path name, which is a name of a path used to access a file containing a data object in a local storage of a storage node, is obtained from the object management table, and the data object is requested.

2. A geographically distributed storage system according to claim 1,
wherein each of the global and local peer-to-peer rings is a distributed hash table ring, and
wherein each of the storage nodes of the geographically distributed storage system is identified by a hash value.

3. A geographically distributed storage system according to claim 2, wherein each second network is provided by an Internet Service Provider, and the first network is the Internet.

4. A geographically distributed storage system according to claim 3, wherein each second network is provided by the Internet Service Provider, and includes a Local Area Network to which the storage nodes are connected and routers which connect the Local Area Network to a network of the Internet Service Provider.

5. A geographically distributed storage system according to claim 4, wherein each storage node includes a storage node head which is connected to the Local Area Network, at least one networked storage which includes Logical Units for storing data objects from the storage node head, and a Storage Area Network which connects the storage node head and the networked storage to each other.

6. A geographically distributed storage system according to claim 3, wherein said global and local routing tables are provided by a hierarchical routing table which stores a plurality of entries, each setting forth a relationship between a name of a distributed hash table ring, a name of an Internet Service Provider for which a distributed hash table ring is constructed, an Internet Protocol address of a next storage node in the distributed hash table ring, and an Internet Protocol address of a previous storage node of the distributed hash table ring.

7. A geographically distributed storage system according to claim 3, wherein said second network node table is provided for the Internet Service Provider and stores a plurality of entries, each setting forth a relationship between a name of the Internet Service Provider, storage nodes connected to the second network provided by the Internet Service Provider, and a name of a parent Internet Service Provider to which the Internet Service Provider is directly connected.

8. A geographically distributed storage system according to claim 3, wherein said metadata table stores a plurality of entries, each setting forth a relationship between a file name which indicates a name of a file which is managed by a storage node, a Hash Identifier which indicates a hash value of the file, a replication number which indicates the number of replications that have been created for the file, and a name of the Internet Service Provider within which a file is stored.

9. A geographically distributed storage system according to claim 3, wherein said object management table stores a plurality of entries, each setting forth a relationship between a Hash Identifier which indicates a hash value of a data object, a path name which is a name of a path used to access a file containing a data object in a local storage of a storage node, permission which indicates what kinds of accesses are allowed to the data object, Access Control List which indicates which users can access the data object, a replication number which indicates the number of replications that have been created for the file containing the data object, and Modified Time which indicates a time when the data object was last modified.

10. A geographically distributed storage system according to claim 3,
  wherein said LU management table is managed by a storage node, and
  wherein said Logical Unit management table stores a plurality of entries, each setting forth a relationship between a Network Storage Name which indicates a name of a networked storage within which logical units are stored and to which a storage node head is connected, the networked storage and the storage node head being included in a storage node, a Resource Identifier which is a unique identifier of logical unit within the networked storage used by the storage node head, a Hashed Logical Unit Number which indicates a hash value of the logical unit, and a Mount Point which indicates which directory the logical unit is mounted on.

11. A storage node for use in a geographically distributed storage system which includes a plurality of logical storage systems, wherein one of said logical storage systems is a global peer-to-peer ring, wherein at least one of the other logical storage systems is a local peer-to-peer ring, wherein said global peer-to-peer ring includes all storage nodes in the geographically distributed storage system connected to each other via a first network, and said local peer-to-peer ring includes storage nodes connected to each other via a second network which forms a part of the first network, and wherein each storage node connected to the second network belongs to both said global peer-to-peer ring and said local peer-to-peer ring, said storage node comprising:
  a plurality of disk drives upon which are formed at least one logical unit which stores data objects; and
  a memory which stores global management information concerning said global peer-to-peer ring and local management information concerning said local peer-to-peer ring,
  wherein the global management information includes a second network node table which is used for managing topology information of second networks forming a part of the first network, a metadata table which is used for managing locations of data stored in the storage nodes of the geographically distributed storage system, and a global routing table which is used for managing routing in the global peer-to-peer ring,
  wherein the local management information includes an object management table which is used for managing data objects stored in the storage nodes connected to the second network, a Logical Unit management table which is used for managing logical units in the storage nodes connected to the second network that store the data objects, and a local routing table which is used for managing routing in the local peer-to-peer ring,
  wherein in the global peer-to-peer ring:
    a hash value of a file which is managed by a storage node in is calculated using a file name which indicates a name of the file which is managed by the storage node,
    the storage node managing the file is determined using the calculated hash value of the file which is managed by the storage node,
    the storage node is requested to obtain an Internet Service Provider name corresponding to the file name from the meta data table,
    a hash value of the Internet Service Provider name is calculated,
    the storage node which manages an Internet Service Provider node table of the Internet Service Provider is determined using the calculated hash value of the Internet Service Provider, and
    the storage node uses the Internet Service Provider name to find nodes that constitute the Internet Service Provider using the Internet Service Provider table, and
  wherein in the local peer-to-peer ring:
    a storage node of the local peer-to-peer ring managing the object management table is determined using the calculated hash value of the file which is managed by the storage node, and
    a path name, which is a name of a path used to access a file containing a data object in a local storage of a storage node, is obtained from the object management table, and the data object is requested.

12. A storage node according to claim 11,
  wherein each of the global and local Peer-To-Peer rings is a Distributed Hash Table ring, and
  wherein each of the storage nodes of the geographically distributed storage system is identified by a hash value.

13. A storage node according to claim 12, wherein each second network is provided by an Internet Service Provider, and the first network is the Internet.

14. A storage node according to claim 3, wherein each second network is provided by the Internet Service Provider, and includes a Local Area Network to which the storage nodes are connected and routers which connect the Local Area Network to a network of the Internet Service Provider.

15. A storage node according to claim 14, said storage node further comprising:
  a storage node head which is connected to the Local Area Network;
  at least one networked storage which includes Logical Units for storing data objects from the storage node head; and
  a Storage Area Network which connects the storage node head and the networked storage to each other.

16. A storage node according to claim 13, wherein said global and local routing tables are provided by a hierarchical routing table which stores a plurality of entries, each setting forth a relationship between a name of a distributed hash table ring, a name of an Internet Service Provider for which a distributed hash table ring is constructed, an Internet Protocol address of a next storage node in the distributed hash table ring, and an Internet Protocol address of a previous storage node of the distributed hash table ring.

17. A storage node according to claim 13, wherein said second network node table is provided for the Internet Service Provider and stores a plurality of entries, each setting forth a relationship between a name of the Internet Service Provider, storage nodes connected to the second network provided by the Internet Service Provider, and a name of a parent Internet Service Provider to which the Internet Service Provider is directly connected.

18. A storage node according to claim 13, wherein said metadata table stores a plurality of entries, each setting forth a relationship between a file name which indicates a name of a file which is managed by a storage node, a Hash Identifier which indicates a hash value of the file, a replication number which indicates the number of replications that have been created for the file, and a name of the Internet Service Provider within which a file is stored.

19. A storage node according to claim 13, wherein said object management table stores a plurality of entries, each setting forth a relationship between a Hash Identifier which indicates a hash value of a data object, a path name which is a name of a path used to access a file containing a data object in a local storage of a storage node, permission which indicates what kinds of accesses are allowed to the data object, Access Control List which indicates which users can access the data object, a replication number which indicates the number of replications that have been created for the file containing the data object, and Modified Time which indicates a time when the data object was last modified.

20. A storage node according to claim 3,
wherein said Logical Unit management table is managed by said storage node, and
wherein said Logical Unit management table stores a plurality of entries each, setting forth a relationship between a Network Storage Name which indicates a name of a networked storage within which logical units are stored and to which a storage node head is connected, the networked storage and the storage node head being included in a storage node, a Resource Identifier which is a unique identifier of logical unit within the networked storage used by the storage node head, a Hashed Logical Unit Number which indicates a hash value of the logical unit, and a Mount Point which indicates which directory the logical unit is mounted on.

* * * * *